US009177116B2

(12) United States Patent
Elazar et al.

(10) Patent No.: US 9,177,116 B2
(45) Date of Patent: Nov. 3, 2015

(54) PROTECTION OF DIGITAL DATA CONTENT

(75) Inventors: Gidon Elazar, Tsur-Yigal (IL); Dan Harkabi, Moshav Lachish (IL); Nehemiah Weingarten, Ramat-Gan (IL); Aviraham Halachmi, Rishon-Lezion (IL); Noam Camiel, Tel Aviv (IL); Eran Fuchs, Tel Aviv (IL)

(73) Assignee: SanDisk Technologies Inc., Plano, TX (US)

( * ) Notice: Subject to any disclaimer, the term of this patent is extended or adjusted under 35 U.S.C. 154(b) by 87 days.

(21) Appl. No.: 12/641,076

(22) Filed: Dec. 17, 2009

(65) Prior Publication Data
US 2010/0095383 A1    Apr. 15, 2010

Related U.S. Application Data

(63) Continuation of application No. 11/050,013, filed on Feb. 2, 2005, now abandoned.

(60) Provisional application No. 60/541,279, filed on Feb. 3, 2004.

(51) Int. Cl.
*G06F 21/10*  (2013.01)
*H04L 29/06*  (2006.01)
(Continued)

(52) U.S. Cl.
CPC ............ *G06F 21/10* (2013.01); *H04L 63/0428* (2013.01); *H04L 63/0853* (2013.01); *H04L 63/10* (2013.01); *H04N 5/913* (2013.01); *H04N 7/1675* (2013.01); *H04N 21/2541* (2013.01); *H04N 21/4181* (2013.01); *H04N 21/4183* (2013.01); *H04N 21/4627* (2013.01);
(Continued)

(58) Field of Classification Search
CPC ........................................................ G06F 21/10
USPC ........................... 726/2, 26–27; 713/100, 193
See application file for complete search history.

(56) References Cited

U.S. PATENT DOCUMENTS 4,634,807 A    1/1987  Chorley et al.
4,757,302 A    7/1988  Hatakeyama et al.
(Continued)

FOREIGN PATENT DOCUMENTS

DE    19820479 A1    12/1999
EP     1304665 A2     4/2003
(Continued)

OTHER PUBLICATIONS

Sung et al, DRM Enabled P2P Architecture Technology, IEEE, 2006, pp. 487-490.*
(Continued)

*Primary Examiner* — Bradley Holder
*Assistant Examiner* — Ali Shayanfar
(74) *Attorney, Agent, or Firm* — Brinks Gilson & Lione

(57) ABSTRACT

Various embodiments include an apparatus, system, and method to control the distribution and usage of copyrighted digital content. The processing of a data file received over a communications network such as the Internet occurs both in a host digital appliance, such as a personal computer, notebook computer, audio player, video player, and the like, and in a very small digital rights management (DRM) module that is removably connected with the host. The processing makes it extremely difficult for the content of the data file to be obtained by an unauthorized person and/or utilized with an unauthorized DRM module.

32 Claims, 8 Drawing Sheets

(51) Int. Cl.

| | | |
|---|---|---|
| H04N 5/913 | (2006.01) | |
| H04N 7/167 | (2011.01) | |
| H04N 21/254 | (2011.01) | |
| H04N 21/418 | (2011.01) | |
| H04N 21/4627 | (2011.01) | |
| H04N 21/8355 | (2011.01) | |

(52) U.S. Cl.
CPC .... *H04N21/8355* (2013.01); *G06F 2221/0797* (2013.01); *G06F 2221/2129* (2013.01); *G06F 2221/2153* (2013.01); *H04L 2463/101* (2013.01); *H04N 2005/91328* (2013.01); *H04N 2005/91364* (2013.01)

(56) References Cited

U.S. PATENT DOCUMENTS

| | | | |
|---|---|---|---|
| 5,446,896 A | 8/1995 | Hegarty et al. | |
| 5,450,489 A | 9/1995 | Ostrover et al. | |
| 5,530,235 A | 6/1996 | Stefik et al. | |
| 5,715,403 A | 2/1998 | Stefik | |
| 5,825,879 A | 10/1998 | Davis | |
| 5,847,698 A | 12/1998 | Reavey et al. | |
| 5,887,269 A | 3/1999 | Brunts et al. | |
| 5,956,034 A | 9/1999 | Sachs et al. | |
| 5,982,891 A | 11/1999 | Ginter et al. | |
| 5,991,399 A | 11/1999 | Graunke et al. | |
| 6,009,525 A | 12/1999 | Horstmann | |
| 6,022,223 A | 2/2000 | Taniguchi et al. | |
| 6,055,314 A | 4/2000 | Spies et al. | |
| 6,118,116 A | 9/2000 | Sawada et al. | |
| 6,226,618 B1 | 5/2001 | Downs et al. | |
| 6,314,409 B2 | 11/2001 | Schneck et al. | |
| 6,351,547 B1 | 2/2002 | Johnson et al. | |
| 6,418,421 B1 | 7/2002 | Hurtado et al. | |
| 6,529,949 B1 | 3/2003 | Gestin et al. | |
| 6,546,193 B1 | 4/2003 | Um et al. | |
| 6,550,011 B1 | 4/2003 | Sims, III | |
| 6,598,164 B1 | 7/2003 | Shepard | |
| 6,611,358 B1 | 8/2003 | Narayanaswamy | |
| 6,636,773 B1 | 10/2003 | Tagawa et al. | |
| 6,697,944 B1 | 2/2004 | Jones et al. | |
| 6,732,275 B1 | 5/2004 | Dimenstein | |
| 6,738,614 B1 | 5/2004 | Blankenship et al. | |
| 6,738,905 B1 | 5/2004 | Kravitz et al. | |
| 6,757,749 B2 | 6/2004 | Aoki et al. | |
| 6,824,051 B2 | 11/2004 | Reddy et al. | |
| 6,876,984 B2 | 4/2005 | Tadayon et al. | |
| 6,886,036 B1 | 4/2005 | Santamaki et al. | |
| 6,907,585 B2 | 6/2005 | Kohno | |
| 6,922,725 B2 | 7/2005 | Lamming et al. | |
| 6,944,600 B2 | 9/2005 | Stefik et al. | |
| 6,973,445 B2 | 12/2005 | Tadayon et al. | |
| 6,974,076 B1 | 12/2005 | Siegel | |
| 6,983,367 B2 | 1/2006 | Go et al. | |
| 7,023,572 B2 | 4/2006 | Tuli | |
| 7,058,818 B2 | 6/2006 | Dariel | |
| 7,068,381 B1 | 6/2006 | Tuli | |
| 7,068,387 B2 | 6/2006 | Ahne et al. | |
| 7,213,004 B2 | 5/2007 | Hars et al | |
| 7,225,340 B2 | 5/2007 | Asahi et al. | |
| 7,249,105 B1* | 7/2007 | Peinado et al. | 705/56 |
| 7,257,309 B1* | 8/2007 | Elswick et al. | 386/200 |
| 7,296,098 B2 | 11/2007 | Shih | |
| 7,313,814 B2 | 12/2007 | Zhu et al. | |
| 7,350,228 B2 | 3/2008 | Peled et al. | |
| 7,483,168 B2 | 1/2009 | Kuwata et al. | |
| 7,751,561 B2* | 7/2010 | Candelore et al. | 380/200 |
| 7,987,492 B2* | 7/2011 | Liwerant et al. | 725/115 |
| 8,132,220 B2* | 3/2012 | Merlin | 725/109 |
| 8,325,918 B2* | 12/2012 | Tada et al. | 380/217 |
| 2001/0013021 A1 | 8/2001 | Saito | |
| 2002/0002541 A1* | 1/2002 | Williams | 705/51 |
| 2002/0025503 A1* | 2/2002 | Chapoulaud et al. | 433/24 |
| 2002/0026424 A1* | 2/2002 | Akashi | 705/57 |
| 2002/0099955 A1 | 7/2002 | Peled et al. | |
| 2002/0112172 A1 | 8/2002 | Simmons | |
| 2002/0141499 A1 | 10/2002 | Goertzen | |
| 2002/0152172 A1 | 10/2002 | Hars et al. | |
| 2002/0176575 A1 | 11/2002 | Qawami et al. | |
| 2002/0184156 A1 | 12/2002 | Tadayon et al. | |
| 2002/0186842 A1 | 12/2002 | Sabet-Sharghi et al. | |
| 2002/0196364 A1 | 12/2002 | Hendricks | |
| 2003/0018582 A1 | 1/2003 | Yaacovi | |
| 2003/0167236 A1* | 9/2003 | Stefik et al. | 705/51 |
| 2003/0194092 A1* | 10/2003 | Parks et al. | 380/281 |
| 2003/0225701 A1 | 12/2003 | Lee et al. | |
| 2004/0010467 A1 | 1/2004 | Hori et al. | |
| 2004/0039932 A1 | 2/2004 | Elazar et al. | |
| 2004/0136536 A1 | 7/2004 | Michtchenko | |
| 2004/0137664 A1 | 7/2004 | Elazar et al. | |
| 2004/0193744 A1 | 9/2004 | Paley et al. | |
| 2004/0205453 A1 | 10/2004 | Mortensen | |
| 2005/0004875 A1 | 1/2005 | Kontio et al. | |
| 2005/0044330 A1 | 2/2005 | Elazar et al. | |
| 2005/0061873 A1 | 3/2005 | Pirillo | |
| 2005/0138407 A1* | 6/2005 | Choudhary | 713/200 |
| 2005/0149450 A1 | 7/2005 | Stefik et al. | |
| 2005/0172122 A1* | 8/2005 | Risan et al. | 713/165 |
| 2005/0195975 A1* | 9/2005 | Kawakita | 380/30 |
| 2005/0230484 A1 | 10/2005 | Cuellar et al. | |
| 2005/0289072 A1 | 12/2005 | Sabharwal | |
| 2006/0010500 A1 | 1/2006 | Elazar et al. | |
| 2006/0021056 A1* | 1/2006 | Koppen | 726/26 |
| 2006/0021057 A1* | 1/2006 | Risan et al. | 726/26 |
| 2006/0080535 A1 | 4/2006 | Elazar et al. | |
| 2006/0084287 A1 | 4/2006 | Miller et al. | |
| 2006/0107326 A1* | 5/2006 | DeMartini et al. | 726/26 |
| 2006/0174267 A1* | 8/2006 | Davydov et al. | 726/26 |
| 2006/0253620 A1 | 11/2006 | Kang | |
| 2007/0027814 A1 | 2/2007 | Tuoriniemi | |
| 2007/0198430 A1 | 8/2007 | Takahashi | |
| 2007/0265977 A1 | 11/2007 | Read | |
| 2008/0065552 A1 | 3/2008 | Elazar et al. | |
| 2008/0065911 A1 | 3/2008 | Elazar et al. | |

FOREIGN PATENT DOCUMENTS

| | | |
|---|---|---|
| EP | 1 376 309 A | 1/2004 |
| GB | 2367925 A | 4/2002 |
| JP | 09-130750 | 5/1997 |
| JP | 2003-046928 | 2/2003 |
| JP | 2003-348075 | 12/2003 |
| WO | WO 98/42098 A1 | 9/1998 |
| WO | WO 01/13199 A1 | 2/2001 |
| WO | WO 01/23980 A1 | 4/2001 |
| WO | WO 01/69354 | 9/2001 |
| WO | WO 01/93000 A2 | 12/2001 |
| WO | WO 03/036975 | 5/2003 |
| WO | WO 2004/086363 A2 | 7/2004 |
| WO | WO 2006/110213 A2 | 10/2006 |

OTHER PUBLICATIONS

Erickson et al, Fair use, DRM, and trusted computing, ACM Digital library, vol. 46 Issue 4, Apr. 2003, pp. 34-39.*

"SanDisk TransFlash Memory Module—The Small, Scalable, Semi-removable Solution for Next-Generation Embedded Flash Data Storage Application," *SanDisk Flash Data Storage*, SanDisk Corporation, 4 pages.

"Memory Stick Media Formats," www.memorystick.com/en/ms/variety.html, pp. 1-3, Feb. 1, 2005.

SD Association (SDA): "Simplified Version of: Part 1 Physical Layer Specification Version 1.01," dated Apr. 15, 2001, 32 pages.

"Universal Serial Bus Specification," revision 2.0, dated Apr. 27, 2000, 84 pages.

Institute of Electrical and Electronics Engineers (IEEE): "IEEE Standard for a High Performance Serial Bus," document No. IEEE 1394—1995, 97 pages.

Institute of Electrical and Electronics Engineers (IEEE): "IEEE Standard for a High Performance Serial Bus, Amendment 1," document No. IEEE Std. 1394a—2000, 11 pages.

(56) References Cited

OTHER PUBLICATIONS

Institute of Electrical and Electronics Engineers (IEEE): "IEEE Standard for a High Performance Serial Bus, Amendment 2," document No. IEEE Std. 1394b—2002, 53 pages.
PCT International Search Report mailed Mar. 19, 2004, International Application No. PCT/US03/25921, 4 pages.
Humer, Caroline, "Students Set to Hit the Latest E-Books," http://msnbc.com/id/4846005/, Apr. 27, 2004, 5 pages.
SanDisk Secure Content Solutions, Inc., "BookLocker™ Secure Digital Books," Product Description, 2005, 4 pages.
Edited by Bill Cope and Robin Freeman, "Digital Rights Management and Content Development: Technology Drivers Across the Book Production Chain, from Creator to Consumer," RMIT University, 2001, whole book (pp. v.-166).
Lesley Ellen Harris, "Digital Property Currency of the 21$^{st}$ Century," published McGraw-Hill Ryerson Ltd, 1998, whole book (pp. vi-230).
National Research Council, "The Digital Dilemma, Intellectual Property Rights and the Emerging Information Infrastructure," National Academy Press, Washington D.C., 2000, whole book (pp. v-340).
Lawrence Lessig, "The Future of Ideas," Random House 2001, whole book (pp. vii-352).
Carol Risher, "Technological Protection Measures (Anti-Circumvention Devices) and Their Relation to Exceptions to Copyright in the Electronic Environment," http://www.ipa-uie.org/events/bookfairs/fbf2000/crisher.html, Oct. 20, 2000, 6 pages.
Mike Godwin, "A Cop in Every Computer," IP Worldwide, http://www.law.com, Jan. 14, 2002, 5 pages.
Mark Walter et al., "DRM: 'Down-Right Messy' and Getting Worse," The Seybold Report, Analyzing Publishing Technologies, vol. 1, No. 3, pp. 5-15.
Renato Iannella, "Digital Rights Management (DRM) Architectures," D-Lib Magazine, vol. 7, No. 6, Jun. 2001, 10 pages.
Joshua Duhl et al., "Understanding DRM Systems—An IDC Whitepaper," www.idc.com, pp. 1-25.
Patricia Evans, "DRM: Is the Road to Adoption Fraught With Potholes?" The Seybold Report, vol. 1, No. 14, Oct. 22, 2001, pp. 1-3.
Richard Eoin Nash, "A Tale of Two E-media Hosts," http://www.hostingtech.com/sp/02_06_sp_tale_print.html, Jun. 2002, pp. 1-3.
Dennis Fowler, "Digital Rights (and Wrongs)," NW, Jun. 2002, pp. 26-31.
Bill Pearson, Technical Marketing Engineer, "Digital Transmission Content Protection," presented Jun. 16, 1999 at Intel Corporation, pp. 1-25.
Jaehong Park et al., "Towards Usage Control Models: Beyond Traditional Access Control," SACMAT'02, Jun. 3-4, 2002, Monterey, CA, pp. 57-64.
Ingemar J. Cox, "Watermarking and Digital Rights Management," NEC Research Institute, Princeton, NJ, Mar. 20, 2001, pp. 1-14.
Eric Knorr, "Content Rights and Wrongs," http://Techupdate.zdnet.com, Dec. 4, 2001, pp. 1-2. Tech Update, Dec. 4, 2001, pp. 1-2.
Mark Stamp, "Digital Rights Management: The Technology Behind the Hype (Draft)," Jun. 6, 2002, pp. 1-15.
Bill Trippe, "XrML and Emerging Models of Content Development and Distribution," The Gilbane Report, Apr. 23, 2002, pp. 1-16.
Mark Walter, "Authentica, Alchemedia Apply DRM to Corporate Intellectual Property," The Seybold Report, vol. 1, No. 12, Sep. 17, 2001, pp. 1-4.
Nic Garnett, "Digital Rights Management, Copyright, and Napster," Jun. 2001, pp. 1-5.
Nic Garnett and Tomas Sander, "Fair Use by Design—Session 3: What DRM can and cannot do and what it is or isn't doing today," 12$^{th}$ Conference on Computers, Freedom & Privacy, San Francisco, Apr. 16-19, 2002, 6 pages.
Joshua Duhl, "Sony Licenses InterTrust's DRM: What Does It Mean?" IDCFlash, Jun. 2002, pp. 1-4.
Dr. John Manferdelli, "Digital Rights Management("DRM")" Unified DRM Group, Microsoft Corporation, Symposium on Embeded Security, 2001, pp. 1-26.
Martha Nalebuff, "Publisher's Dilemma," Unified DRM Core at Microsoft Corporation, Seybold, Apr. 10, 2001, pp. 1-6.
Amy Carroll et al., "Microsoft Palladium: A Business Overview," Microsoft Content Security Business Unit, Jun. 2002, pp. 1-9.
Gordon Lyon, "The Internet Marketplace and DRM," Convergent Information Systems Division, NIST, Jul. 12, 2001, pp. 1-12.
Michael Calvert, "Content Management—Timetable for Digital Rights Management," InSide Gartner This Week, No. 2, Jul. 18, 2001, pp. 1-3.
Kim Zwollo, "Digital Document Delivery and Digital Rights Management," IOS Press, 2001, pp. 9-11.
Olin Sibert, "Digital Rights Management: The Future Is Secure Hardware," Electronic Design, vol. 48, i10, May 15, 2000, p. 56.
Info-Tech Advisor Newsletter, "Digital Rights Management 101," Jun. 26, 2001, pp. 1-2.
"Fair Usage Definition Called Key to Digital Rights Management," Communications Daily, v 22, i25, Feb. 6, 2002, pp. 1-2.
"Lack of DRM Standards Impeding Broadband Demand," Audio Week, v. 13, i51, Dec. 24, 2001, pp. 1-2.
Linden deCarmo, Media Alert—New Digital Rights Technologies Protect Content Creators' Interests, But What About Users' Rights? PC Magazine, Jun. 26, 2001, pp. 1-5, 80.
Harvey Ardman, "Will DRM Make Digital Publishing More Profitable?" Seybold Seminars, Boston, Apr. 2001, pp. 1-2.
Susan Marks, "Staking Out Digital Rights; Digital Rights Management Software Addresses the Thorny E-Comm Problem of Sharing Content While Protecting Intellectual Property," Network World, Feb. 18, 2002, pp. 1-2, 70.
Robert Bolick, "Pricing Digital Content," Professional Book Group, The McGraw-Hill Companies, Mar. 11, 2001, pp. 1-8.
Yuval Levin, "Talking to ourselves," Liberzine.com, Sep. 6, 2000, pp. 1-3.
Clifford Lynch, "The Battle to Define the Future of the Book in the Digital World," First Monday, May 2001, pp. 1-49.
Richard Stallman, "The Right to Read," GNU Project—Free Software Foundation (FSF), Feb. 1997, pp. 1-5.
"The Digital Millennium Copyright Act of 1998," (DMCA) Pub. L. No. 105-304, 112 Stat. 2860, Dec. 1998, pp. 1-18.
"Doesn't Everybody Do It?—Internet Piracy Attitudes and Behaviors," A report on a survey conducted by SIIA and KPMG—Fall 2001, pp. 1-32.
"IIPA 2000-2001 Estimated Trade Losses Due to Copyright Piracy," International Intellectual Property Alliance (IIPA), Apr. 30, 2002, pp. 1-2.
Ipsos-NPD, "Briefing: The Online Book Marketplace," May 2001, 33 pages.
Terje Hillesund, "Will E-books Change the World?" First Monday, Sep. 14, 2001, pp. 1-21.
George Alexander et al., "The Road Ahead: Problems Facing the Publishing Industry Today," The Seybold Report, Apr. 22, 2002, vol. 2, No. 2, pp. 3-9.
John Markoff, "Fears of Misuse of Encryption System Are Voiced," New York Times, Jun. 20, 2002, pp. 1-3.
"Trusted Computing Platform Alliance (TCPA)," TCPA Design Philosophies and Concepts, Version 1.0, Copyright 2000 Compaq Computer Corporation, Hewlett-Packard Company, IBM Corporation, Intel Corporation, Microsoft Corporation, Jan. 25, 2001, V. 1.0 25, pp. 1-30.
Joshua Piven, "Tech vs. Tinseltown," Computer Technology Review, Los Angeles, May 2002, pp. 1-4.
"The Need for a Rights Language," Technical White Paper, Version 1.0, ContentGuard 2001, pp. 1-12.
"Extensible Rights Markup Language (XrML) 2.0 Specification," Part 1-Part V, ContentGuard, Nov. 20, 2001, 154 pages.
"Digital Rights Management for Ebooks: Publisher Requirements," Version 1.0, Association of American Publishers (AAP), Nov. 27, 2000, pp. 1-66.
USB Implementers Forum, "Universal Serial Bus Mass Storage Class, UFI Command Specification," Revision 1.0, Dec. 14, 1998, pp. 1-53.
Kim, Won et al., "Object-Oriented Concepts, Databases, and Applications," New York, New York: ACM Press, 1989, ISBN 0-201-14410-7, pp. 4-5.

(56) References Cited

OTHER PUBLICATIONS

Comer, Douglas et al., "Operating System Design vol. 1: The Xinu Approach," Englewood Cliffs, New Jersey, Prentice Hall, 1989, pp. 308-309.
Taiwanese Patent Office, Preliminary Notice of Rejection, mailed in corresponding Taiwanese Patent Application No. 094103425 on Oct. 26, 2006, 2 pages.
Taiwanese Intellectual Property Office, "Official Notification," mailed in related Taiwanese Patent Application No. 094103425 on Jun. 6, 2007, 3 pages (including translation).
EPO, "Office Action," mailed in related European Patent Application No. 05 712 869.6 on Jul. 24, 2007, 4 pages.
"Sandisk BookLocker aka FlashCP DRM/Based USB Stick," Colin Dunstan & Flauzon, Internet Article, Jun. 29, 2005, Retrieved from the Internet on Jun. 18, 2008, URL: http://www.mobileread.com/forums/showthread.php?t=4377, 1 page.
"BookLocker," SanDisk, Internet Article, Feb. 6, 2005, XP002484733, Retrieved from the Internet on Jun. 18, 2008, URL: http://web.archive.org/web/20050206053008/http://www.sandisk.com/retail/booklocker.asp, 1 page.
"Sandisk Frees Students from Heavy Backpacks," Press Release (Online), Jun. 28, 2005, Retrieved from the Internet on Jun. 18, 2008, URL: http://www.sandisk.com/Corporate/PressRoom/PressReleases/PressRelease.aspx?ID=1726, 1 page.
"Sandisk Introduces Ultra II SD Plus, a Dual-Purpose SD Memory Card with Built-In USB Connectivity," Press Release (Online), Feb. 19, 2005, XP002484735, Retreived from the Internet on Jun. 18, 2008, URL: http://www.sandisk.com/Corporate/PressRoom/PressReleases/PressRelease.aspx?ID=1025, 1 page.
First Office Action of China State Intellectual Property Office, Application No. 200580007384.9, dated Sep. 10, 2009, 5 pages.
European Patent Office/International Searching Authority, "Notification of Transmittal of the International Search Report and the Written Opinion of the International Searching Authority, or the Declaration," mailed in corresponding International Application No. PCT/US2005/003583 on Aug. 23, 2005, 22 pages.
USPTO, "Office Action," mailed in U.S. Appl. No. 11/050,013 on Oct. 6, 2008, 58 pages.
USPTO, "Final Office Action," mailed in U.S. Appl. No. 11/050,013 on Jun. 17, 2009, 39 pages.
Extended Search Report for European Patent Application No. 09010277.3 dated May 6, 2010, 6 pages.
Office Action issued in corresponding Japanese Appln. No. 2006-552271 dated Jan. 18, 2011 (6 pgs).
Extended European Search Report issue in corresponding EP Appln. No. 10 07 5653.5 dated Dec. 22, 2010 (6 pgs).
Office Action from corresponding Chinese Appln. No. 200580007384.9 dated Mar. 10, 2011 (12 pgs).
Office Action issued in corresponding Chinese Appln. No. 200580007384.9 dated Dec. 11, 2013 (16 pgs).

\* cited by examiner

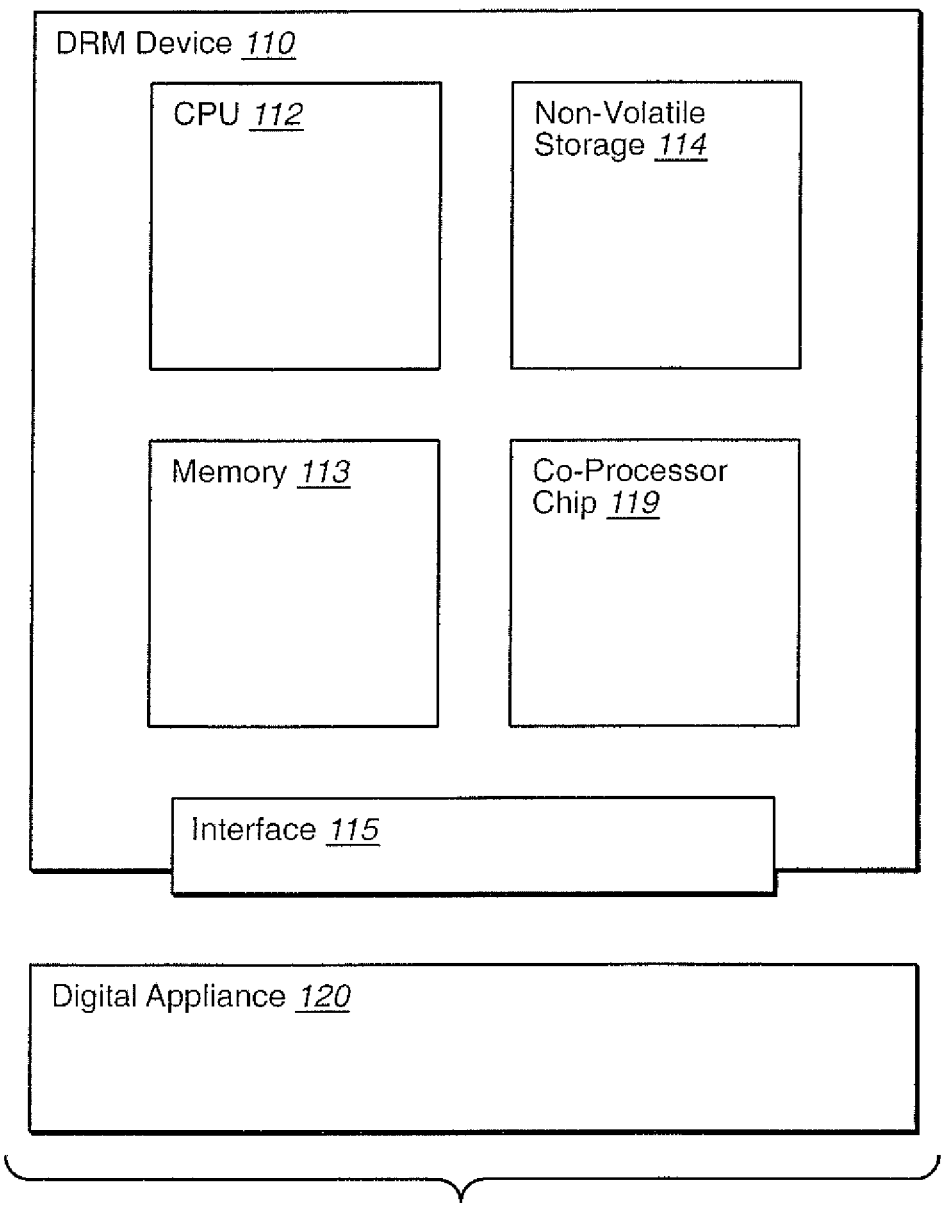
FIG._1

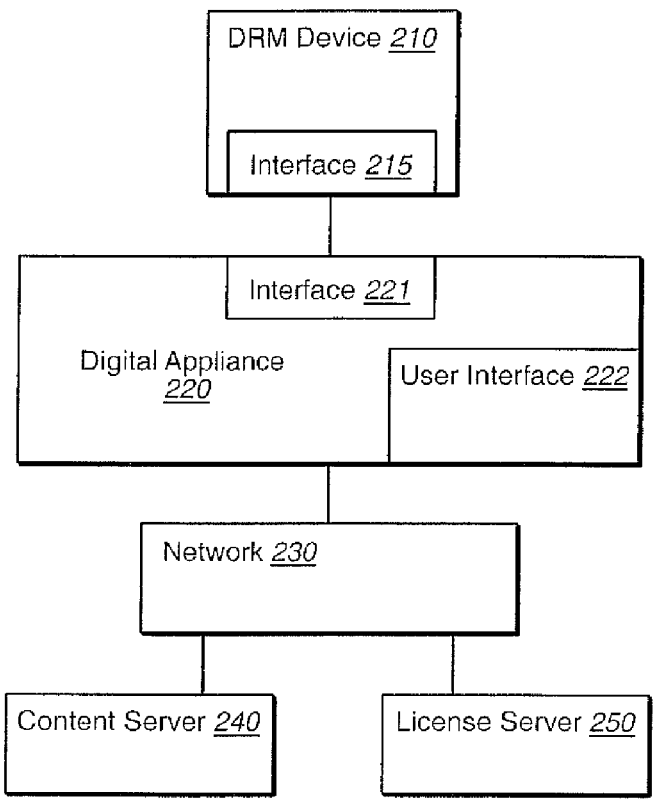
FIG._2
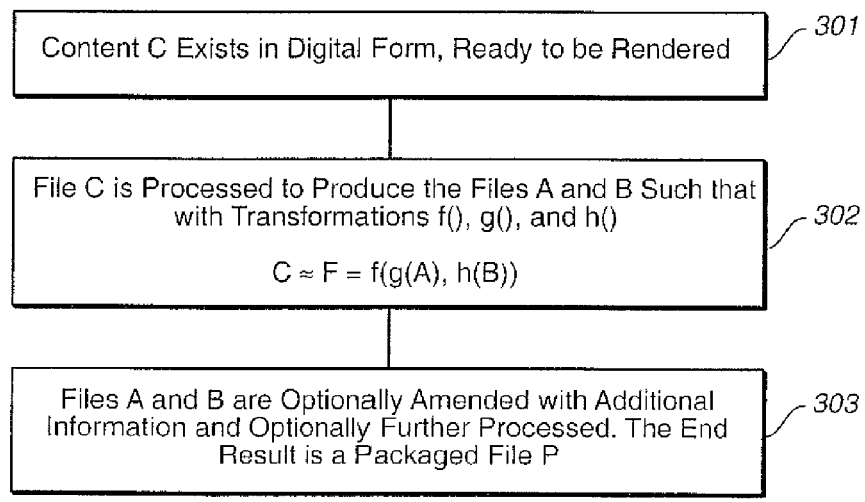
FIG._3

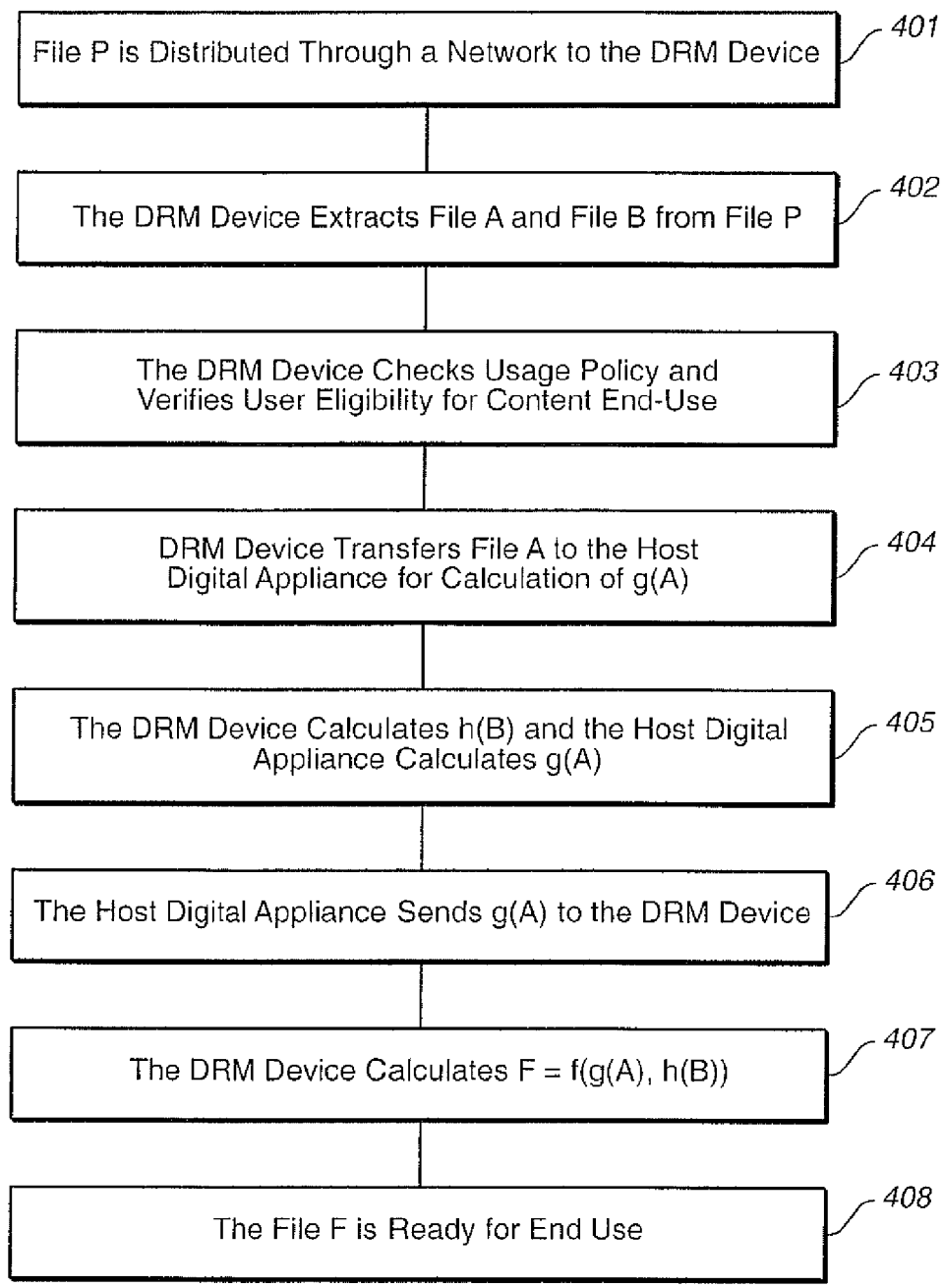
FIG._4

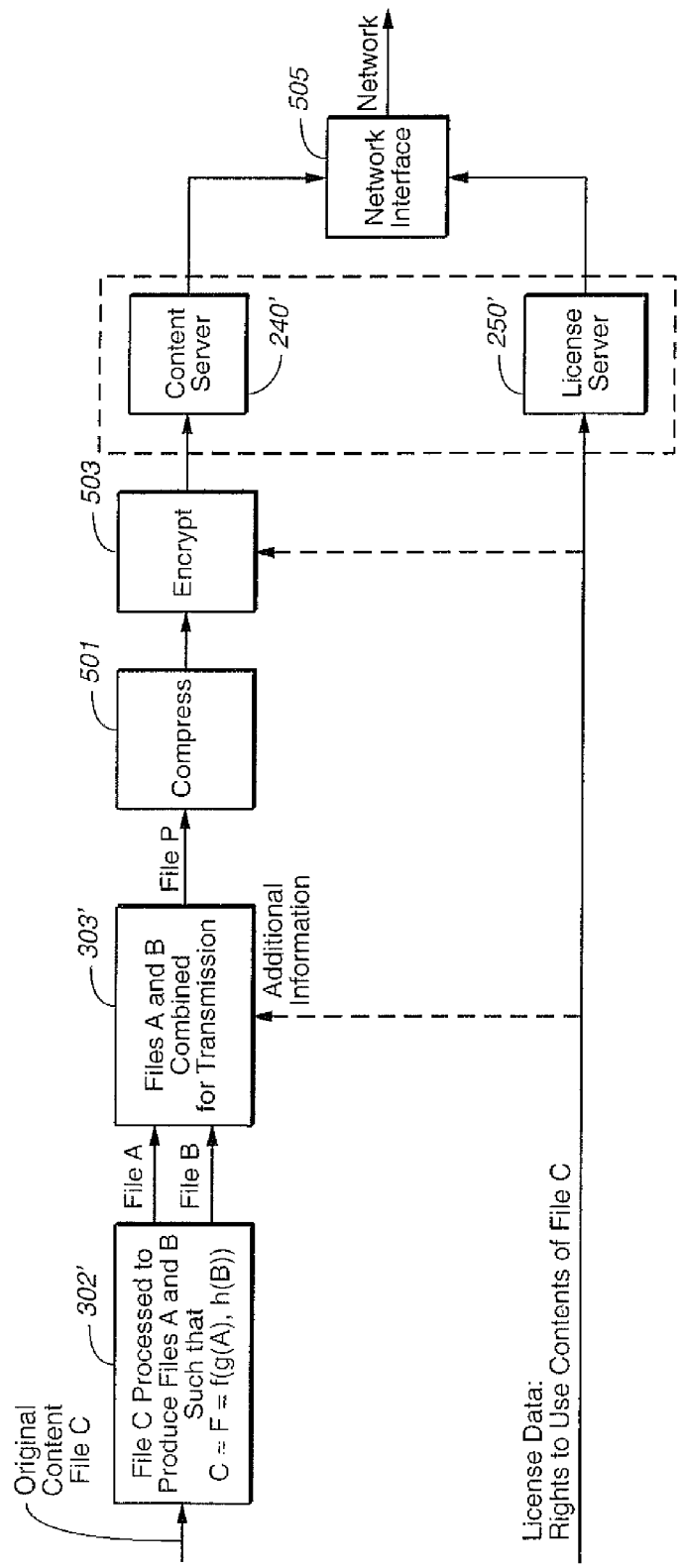
FIG._5

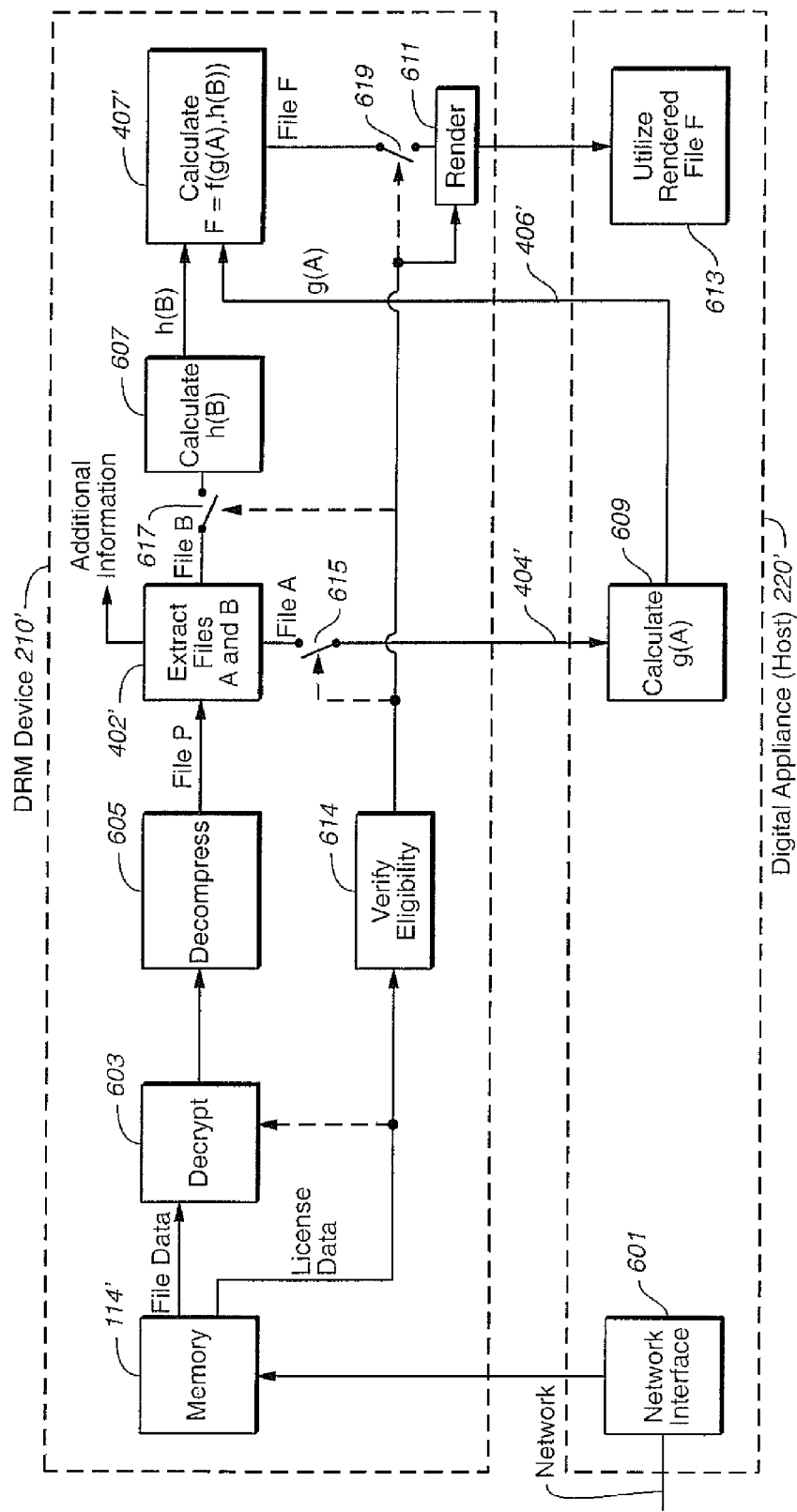
FIG._6

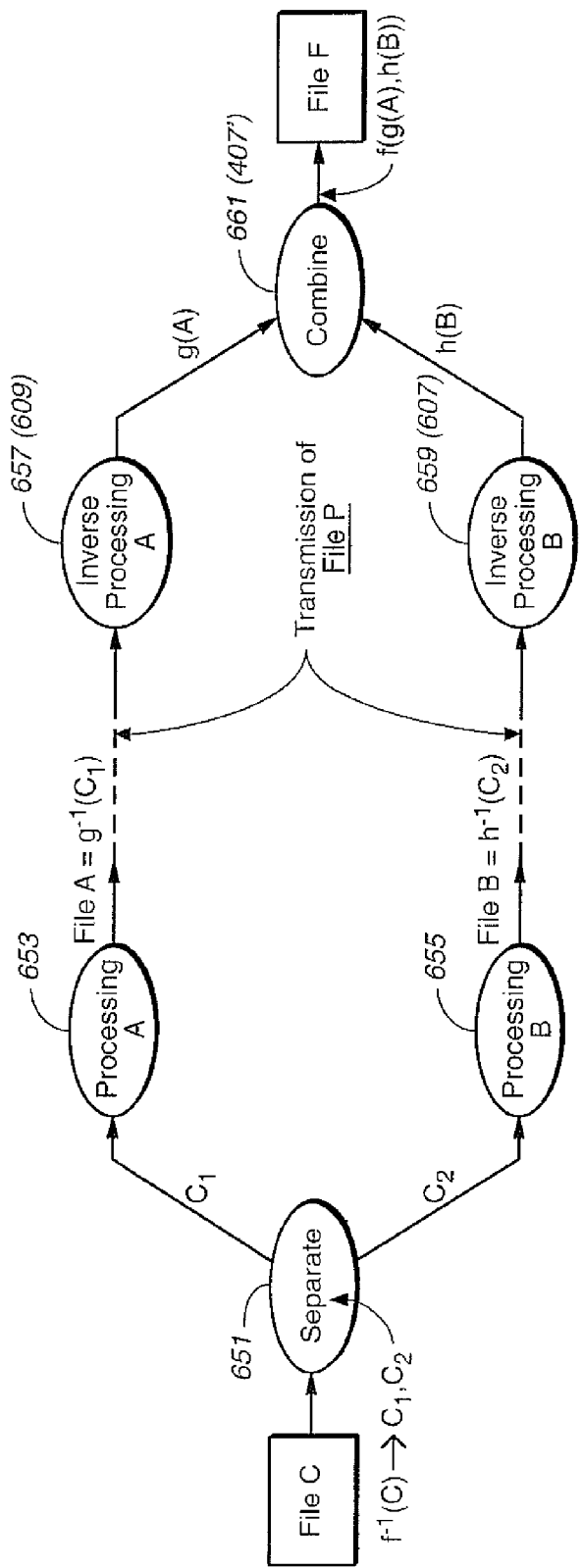
FIG._7

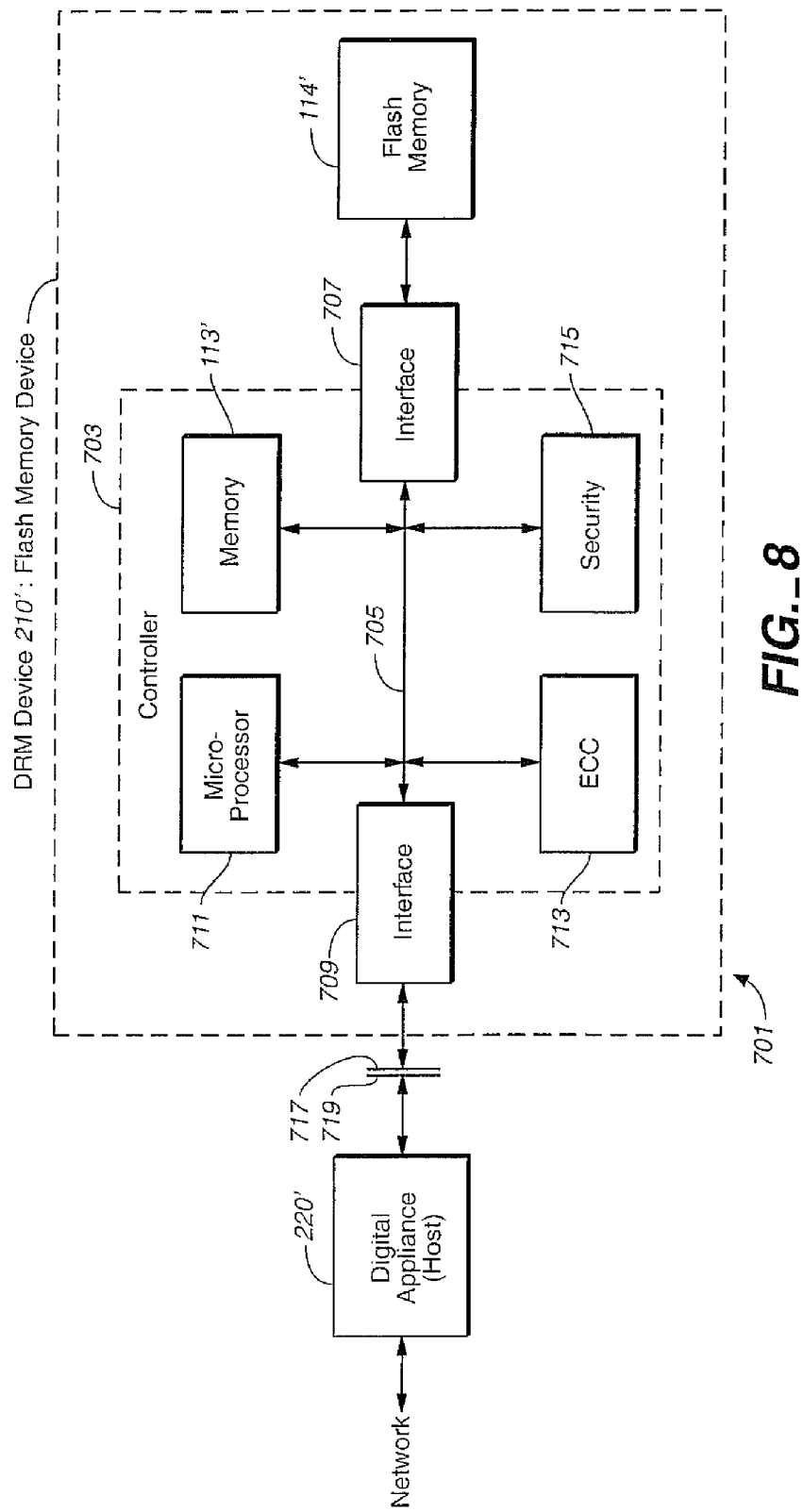
FIG._8

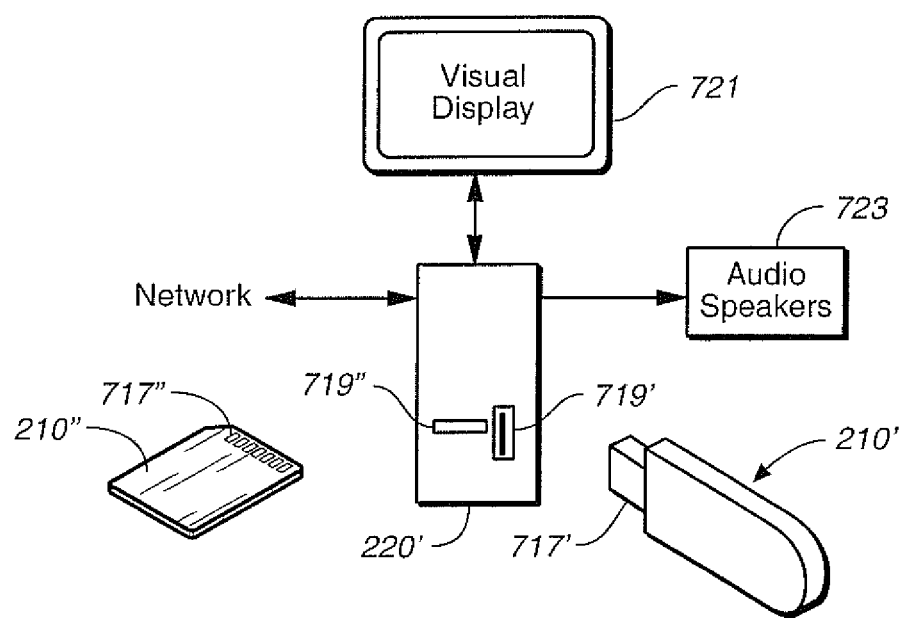
FIG._9

PROTECTION OF DIGITAL DATA CONTENT

CROSS-REFERENCE TO RELATED APPLICATIONS

This application is a continuation of U.S. application Ser. No. 11/050,013 filed Feb. 2, 2005, and also claims the benefit of Provisional Patent Application No. 60/541,279, filed Feb. 3, 2004. This application is also related to U.S. patent application Ser. No. 10/227,155, filed Aug. 23, 2002, and published under No. 2004/0039932A1 on Feb. 26, 2004. Both of these applications are incorporated herein in their entirety by this reference for all purposes.

BACKGROUND

This invention generally relates to the field of digital rights management, and more particularly, to methods of remotely enforcing digital content policy.

The Internet worldwide network, as well as other data communication networks, enables many digital appliances to interconnect and exchange information. Digital appliances include personal computers, laptop computers, tablet computers, PDAs, mobile phones, MP3 players, DVD players, gaming consoles, digital recording devices such as digital cameras, and others. A particular use of the Internet, and other networks such as cable and satellite or a corporate or organization network is to distribute digital files, specifically digital content files.

A Digital Content File is data which has an end use of being either viewed, listened to, read, played, executed, or otherwise utilized by an end user, and at some point prior to end use is stored and/or represented in numerical form. A Digital Content File may be an audio file, a video file, a software file, an electronic book, a document, a computer game or other types of content.

A Copyrighted Digital Content File is a Digital Content File which has legal limitations on at least one end use. For example, a user may not create a copy of, distribute, modify, sell, and/or perform other end uses of a Copyrighted Digital Content File, without receiving permission from the copyright owner. Examples of Copyrighted Digital Content Files are commercial movies, commercial music, electronic books, software, computer games, and the like.

The raw digital representation of high quality multimedia files such as audio and video uses high rate of data sampling to turn analog information into digital data. This representation consumes large quantities of storage. For example a WAV format file which represents a typical audio clip of 3 minutes length, can easily be larger than 30 Megabytes in size. A typical 60 second video clip can take up 1.5 GB when not compressed. Transferring data over a network such as the Internet has a cost that may be quantified both in monetary terms and in respect to time needed to transfer information. The larger the files to transfer, the more time the transfer will take, and for connections that are paid for according to connection time, the more it will cost.

In order to reduce the time and cost of storing and/or transferring digital multimedia files over a network, experts in the field devised sophisticated algorithms that compress the digital content files to smaller files. Although the compression techniques are usually lossy (the data cannot be exactly restored when decompressing), standard compression and decompression techniques for audio and video produce a result that is usually negligibly different for human ears and/or eyes. Good compression techniques can reduce an audio file to ten percent of its original size, and a video file can be compressed much more. Taking the above example of a 3 minute song coded in WAV at 30 MB, a compressed version can take up only 3 MB of memory.

The most famous family of compression techniques is collectively known as Moving Picture Expert Group (MPEG). One of the subfamilies of MPEG audio compression techniques is called MP3, short for Moving Picture Expert Group Audio Layer 3.

In order to play an MP3 audio file on a computer or MP3 player, a rendering software and/or hardware application that decompresses the file and sends a bit stream to the audio equipment that drives the speakers is utilized. An example of such software is Winamp by Nullsoft. There exist applications that can render both audio and video for example Microsoft Media Player.

The advent of the Internet and MP3 compression in the late 1990's brought about a revolution in music distribution worldwide. Peer to Peer systems were created in which one person would copy music from a CD to a computer, compress it to MP3 format and then share it with tens, hundreds and even thousands of other people, by sending the files over the Internet. The most famous example of a software system that provided application infrastructure for the sharing of digital music files is Napster, by a company of the same name. Napster was ordered to shut down by a US court, because the system was used mostly for sharing copyrighted music files, without providing compensation to the artists and the recording companies that produced these works. Although Napster in its original form no longer exists, many similar services abound today, in which users from all over the world may share digital content of any sort, including music, movies, software applications, games, and other files.

Content owners have been trying to fight this phenomenon since it began, claiming a sharp decrease in their revenues due to digital content "piracy". So far, content owners such as recording companies and movie studios have met with very limited success in their attempts at using technological solutions to solve these problems.

Although free content downloading applications abound, pay services for digital content such as music have also appeared recently by vendors such as RealNetworks, Apple, and Microsoft MSN Music Club in Europe. Users pay a fee per song, which is then downloaded to their computer, and which they can then play or copy to CDs or other devices. Alternatively, users subscribe for unlimited access to songs for a given period of time. These services do specify to users what they may do with the files once they are downloaded, but are not successful in enforcing the specified usage policies.

In order to combat downloading and sharing of copyrighted digital content by parties that are not licensed to do so, and to enforce use of digital content according to license, various protection methods are employed by content owners. The collective term for the control of distribution and usage of digital content is Digital Rights Management (hereafter DRM). DRM systems typically involve cryptographic methods for the secure distribution of the content between a content repository/server and a digital appliance. Such methods typically require the appliance to include an implementation of cryptographic algorithms and hold cryptographic keys in order to gain access to the content.

In many cases the software application used to render the digital content implements some form of DRM that is engaged when the user attempts to access the digital content, for example Microsoft MediaPlayer which is used to view video files and listen to audio files, has built in DRM functionality. One of the operations performed by such an application is the process of decrypting the content file using cryptographic methods and cryptographic keys. In order to execute such operations, the application must have access to the cryptographic methods and keys; therefore the cryptographic methods and keys must reside within the reach of the application. Typically the cryptographic methods, the keys, or both, reside within the application, in the digital content file itself, or somewhere within the digital appliance storage.

A digital appliance such as a computer or PDA is typically an open platform enabling computer programmers to develop programs for it. In some cases, software programs are developed for the purpose of hacking and locating the cryptographic keys and algorithms of a DRM system, in order to circumvent the DRM and gain access to the content. This process is generally called an "attack" and if it succeeds it is commonly referred to as a "crack" or a "hack" to the DRM system. A computer program that performs this function is referred to hereafter as a hacking program or a cracking program.

Examples of successful attacks are well known in the art. In 2001 Microsoft's Media Player was cracked by a programmer using the pseudonym "Beale Screamer".

Other forms of attacks include using programming tools. For example, software debuggers track and trap the digital content information after the rendering application has decrypted it, retrieving the "protected" information. Such information includes the digital content file and metadata describing how it is to be rendered. A hacking program that cracks the application and releases this information from the DRM system enables the construction of unauthorized copies of the original digital content file.

As a countermeasure, DRM systems can use more sophisticated cryptographic schemes and code obfuscation techniques. Other methods include adding tamper resistant hardware to store the cryptographic keys. Examples of such methods are cryptographic tokens such as iToken by Rainbow Technologies Inc. or using a smart card to store cryptographic keys and optionally cryptographic algorithms. Such solutions either reveal the cryptographic key to the digital appliance in the process of decrypting the information, or internally perform the cryptographic functions but reveal the end result in a raw form that can then be accessed.

A side effect that arises from the above content protection methods is that the software application that renders the digital content takes an active part in the protection process by implementing the above mentioned cryptographic methods and code obfuscation. Since the content protection implementation must be kept secret, it can be known solely by the organization that developed the software application. Furthermore, the content itself must be amended with cryptographic keys and data that are known only to that specific implementation, making the specific software application be the only software piece that can decrypt and render the content. By tying content to be used by a specific software application, the type and variety of digital appliances that may be utilized to use the content is limited to the type and variety of the consumer electronic appliances that the organization that developed the application decides to support.

The above methods have proven to slow, but not halt, an adversary. Given enough time and effort, a computer program that cracks a DRM system may be written. It can be appreciated by those skilled in the art that such successful attacks are easier to carry out on software applications that execute in an open development environment that enables programmers to develop software programs. Similarly, cryptographic co-processors leave the content vulnerable after decryption.

Another method that is partially effective in preventing digital content files from being copied and disseminated without control is the streaming of digital content files such as audio and video files to users. In this scenario, files are not downloaded to be stored on a digital appliance but rather "broadcast" much like a radio program. This ensures that only a small block of the content is present on the digital appliance at each given moment. The downside of this is that a user must be connected to the streaming source or online during the entire duration of the music program or movie. Another problem with streaming is that, in contrast to a file that is saved on the digital appliance storage, a user that has paid for content that is streamed cannot access the content at all times. Another shortcoming of streaming is that programs exist today for recording the streamed content and reconstructing a digital copy of the original digital content, without creating a noticeable difference to the human eye or ear.

To summarize the problems with existing solutions for distribution and control of copyrighted digital content, existing art stores encrypted copyrighted digital content and rendering software applications in open computing systems that are easy to crack. By tying digital content to a specific format and a specific rendering software application, the number of different types of digital appliances that can be utilized for an end-use of the digital content is limited. Furthermore, streaming solutions are inconvenient for users and easily circumvented.

There is clearly an unmet need for a system, apparatus, and method for enabling users to possess and use copyrighted digital content but within limitations specified by the owners of the copyright.

SUMMARY OF THE INVENTION

The above-mentioned disadvantages and problems are addressed by the present invention, which will be understood by reading the following specification.

It is an object of the present invention to provide a DRM device.

It is another object of the present invention to provide a method for preparing copyrighted digital content for usage with a DRM device.

It is yet another object of the present invention to provide a method and system for distributing and rendering copyrighted digital content using a DRM device.

In some embodiments the following steps occur. Before distribution, the original copyrighted digital content is processed to produce two or more parts (hereafter files) such that each one separately is not sufficient for end use of the copyrighted digital content. The processing of the copyrighted digital content into two files is explained in detail hereafter. The two resulting processed files are recombined into a unified file which is compressed and encrypted in order to be distributed over a network. In some embodiments the unified file may contain additional data. The unified file is distributed over a network to a digital appliance with a DRM device connected to it. The received unified file is stored in the DRM device. The DRM device separates the unified file into the two files. At the appropriate time, one file or section of a file is sent to the digital appliance for processing and the second file or section of the second file is processed internal to the DRM device. At the appropriate timing, the result of such processing is combined either inside the DRM device or in the digital appliance to produce data and content that can be used by an end user. At no point during this process is the complete set of original content available on the digital appliance nor is the complete set of processing algorithms used to produce the useable content available on the digital appliance, hence open for the possibility of hacking.

The DRM device can process policies such as expiration, limited number of uses, replication, and other usage policies for rendering the content file on the digital appliance. If a user is not allowed to use a certain copyrighted digital content file, then the production process is not initiated.

BRIEF DESCRIPTION OF THE DRAWINGS

The foregoing and other objects, aspects and advantages will be better understood from the following detailed description of embodiments of the invention with reference to the drawings, wherein:

FIG. 1 is a schematic block diagram of an embodiment of the DRM device;

FIG. 2 is a schematic block diagram of an embodiment of the system;

FIG. 3 is a flowchart of an exemplary method for preparing a digital content file for use with the DRM device;

FIG. 4 is a flowchart of an exemplary method for rendering a digital content file using the DRM device;

FIG. 5 illustrates in a different format the processing of FIG. 3 that prepares a digital content file for use with the DRM device;

FIG. 6 illustrates in a different format the processing of FIG. 4 that renders a digital content file using the DRM device;

FIG. 7 shows in a different format a part of the signal processing included in FIGS. 3-6;

FIG. 8 is a block diagram of an example implementation of the DRM device within a flash drive that is removably connectable to a digital appliance host; and FIG. 9 schematically illustrates a mechanical configuration of the flash drive DRM device and digital appliance host of FIG. 7.

DESCRIPTION OF EXEMPLARY EMBODIMENTS

In the following detailed description of exemplary embodiments of the invention, reference is made to the drawings that illustrate specific exemplary embodiments in which the invention may be practiced. Those skilled in the art will appreciate that other embodiments may be utilized without departing from the spirit of the present invention; therefore the following detailed description of the invention should not be taken in a limiting sense.

FIG. 1 is a diagram of an exemplary embodiment of the DRM device hardware 110, which includes a central processing unit (CPU) 112, an optional system memory 113, an optional co-processor chip 119 an optional non-volatile storage 114, and an interface 115 to connect the device 110 to a digital appliance 120. There may be only one or a plurality of central processing units 112, as there may optionally be only one or a plurality of system memory 113 or non-volatile storage 114. There may be only one or a plurality of interfaces 115; the invention is not so limited. The non-volatile storage 114 may be included in the CPU 112 or be discrete from the CPU 112; generally, components or subcomponents of the DRM device hardware 110 may be combined with other components or subcomponents of the DRM device for higher integration and perhaps lower cost.

The CPU 112 may be a general purpose CPU or a CPU with dedicated functions. Furthermore the CPU 112 may include internal memory, and internal non-volatile storage which in the description of the present invention may serve a similar purpose of the system memory 113, and/or non-volatile storage 114 respectively. The CPU 112, the non-volatile storage 114, and/or other components may be implemented as a tamper resistant hardware, or sections of the CPU 112, the non-volatile storage 114, and/or other components may be tamper resistant; the invention is not so limited.

The non-volatile storage 114 may be any of several types of storage including semiconductor based media such as read only memory (ROM), electronic erasable programmable read only memory (EEPROM), flash memory or battery backed up random access memory (RAM), or magnetic media storage such as hard disk drive or floppy disk, or the like, or other types of non-volatile storage, this invention is not so limited.

The interface 115 can connect the DRM device 110 with a digital appliance 120 in both physical and communication aspects. The physical aspect can be, for example directly, through one or more cables, and/or wireless. The communication aspect of the interface 115 allows data exchange between the DRM device and the digital appliance. The interface 115 may be any of several types of interfaces, for example PCI, ISA, Universal Serial Bus (USB), FireWire, IDE, SCSI, RS-232 or other serial interface, parallel interface, Compact Flash (CF) interface, Sony Memory Stick interface, Multimedia Card (MMC), secure digital (SD), mini secure digital, extreme digital (xD), Bluetooth, Infiniband, mobile phone interface, PDA interface, and/or any other type of interface that may be used to connect a DRM device with a digital appliance.

The Digital Appliance 120 is used by an end user for some end use of one or more digital content files. Digital appliance 120 may be any of several types of devices, for example a PC, laptop, tablet computer, PDA, mobile phone, mp3 player, DVD player, personal video player, programmable consumer electronics, or any other device that may be used with digital content.

The non-volatile storage 114 contains instructions which may be executed by the CPU 112. The non-volatile storage 114 further may contain: an optional unique device serial number, a method of authentication such as a unique pair of public and private cryptographic keys and a signed authenticity certificate. The instructions stored in the non volatile storage 114 allow the digital appliance 120 to access a portion of the non volatile storage 114 through the interface 115, but prevent access to another portion of the non volatile storage 114, including a portion that stores the private cryptographic key and a portion that stores instructions that execute in a closed environment without enabling user access. The non-volatile storage may also store a plurality of methods for authentication; the invention is not so limited.

The optional co-processor chip 119 may be used in conjunction with CPU 112 in processing and formatting content for end use, such as audio, video, games and the like content, thus achieving higher computing capability. Co-processor chip 119 may process none, some, parts or all of the digital content; the invention is not so limited.

Examples of co-processor chips used to decode video are EM8485 MPEG-4 Decoder for Set-top Appliances and Media Gateways by Sigma Designs and the like.

FIG. 2 is a diagram of an exemplary embodiment of the system which includes a DRM device 210 with an interface 215, a digital appliance 220 with an interface 221 which matches the interface 215 of the DRM device 210, a user interface 222 on which a processed digital content may be presented (for example as a video, visual image, synthesized audio, synthesized video games or other form) to the user, a network 230, a content server 240 which is a computer that can transfer digital content over the network and a license server 250 which is a computer that may transfer authentication and/or decryption and/or policy and/or formatting information over the network. According to one embodiment this information is embedded in one or more files. According to some embodiments, none, some, or all of the digital content may be copyrighted, the invention is not so limited. The system may include a plurality of DRM devices 210, digital appliances 220, content servers 240 and license servers 250, the invention is not so limited.

The interface 221 connects the digital appliance 220 with a DRM device 210. The interface 221 may be any of several types that may be used to connect a device with a digital appliance. The interface 221 of the digital appliance 220 matches the type of interface 215 of the DRM device in a form that enables information to pass between the DRM device 210 and the digital appliance 220.

The content server 240 is a computer that can be accessed through a network 230 such as the Internet network. The content server 240 can respond to requests to download copyrighted digital content such as video, audio, ebooks, software, games and the like.

The license server 250 is a computer that can be accessed through a network 230 such as the Internet network. A license server 250 can respond to requests to download information such as authentication and/or decryption and/or policy and/or formatting information. This data may include: definition of policies to be used by the DRM device policies, definition of formatting to be used by the DRM device formatters, definition of decryption to be used by the DRM device decryptors, definition of authentication to be used by the DRM device authenticators, the digital content file, parts of the digital content file, information regarding the user, information regarding the rights of the user to one or more end uses (the user may have access to all possible end uses or less than all possible end uses) of the digital content file or part of the digital content file, information regarding the vendor/owner/operator of the system, information regarding the specific DRM device 210, and other information. The information may be utilized by the DRM device 210 and/or the digital appliance 220. The information may be utilized while the user makes end-use of the digital content or in preparation for enabling the user to make end-use of the digital content.

According to some embodiments, the content server 240 and the license server 250 are implemented as separate entities that interconnect through a network and do not directly interconnect. According to other embodiments the content server 240 and the license server 250 directly interconnect. According to other embodiments the content server 240 and the license server 250 are implemented as a single entity, the invention is not so limited.

An authenticator implemented in a DRM device 210 participates in the process of authenticating the DRM device to a remote server over a network. An authenticator may implement one of several methods of authentication including sending a device ID number to the remote server. Another authenticator uses an encryption secret key known only to the DRM device 210 and the server, and bases the authentication on challenging the DRM device 210 in order to verify that it has possession of the secret key. In some embodiments of such an authentication process, the server sends an encrypted message to the DRM device 210, and the authenticator at least decrypts the message and returns it to the server. In some embodiments, the same key can be used in a variety of methods to authenticate, for example, by signing a plaintext message and/or decrypting an encrypted message. In some embodiments, the authenticator responds to challenges by performing a series of operations such as decrypting a message, processing the result, encrypting the result, and returning it to the server for verification. For this authentication process to occur, the secret key may be stored in the DRM device 210 prior to the authentication process. The stored key can be a single key stored equally on all DRM devices or a dedicated key unique to each DRM device 210. In the latter case the server should know in advance which key is stored within which DRM device.

Another method to authenticate uses a public and private key and a digital certificate. In such an embodiment, the authenticator has access to a private key and a matching public key stored in the DRM device 210. The private key must be kept secret, but the public key may be made public. The server may then challenge the authenticator with a message encrypted with the DRM device 210 public key to ensure it has access to the matching private key. In some embodiments, the authenticator signs a message but does not necessarily encrypt the message. Optionally the server can receive from the DRM device 210 a digital certificate, which contains device identification information such as the device serial number or device ID and/or the public key of the device and/or additional information relating to the device, the server, the organization operating the system or any other information. The DRM device 210 identification information is digitally signed by a trusted authority, such as the vendor of the device, owner of the server, the organization operating the system and/or another trusted authority to form a digital certificate for that device. Some embodiments of the authenticator can authenticate the DRM device 210 and/or a user of the DRM device 210.

A decryptor in the DRM device 210 participates in the process of transforming encrypted digital content or parts of digital content into a decrypted form. A decryptor may implement one or more of several methods: symmetric algorithms such as DES, 3DES, AES, and IDEA; and/or asymmetric algorithms such as RSA, Diffie-Hellman, elliptic curve; and/or others. A decryptor may implement one or a plurality of decryption methods. A decryptor may include hashing algorithms such as DSA, MD2, MD4, MD5, HMAC and/or SHA1 and/or others to retrieve a signature and check origin and integrity of the data received. The decryption key or plurality of decryption keys for such operations may originate in one or a plurality of sources. For example, decryption key data can be stored in the non-volatile storage of the DRM device 210, received from the digital appliance 220, and/or received from a network server, such as through the digital appliance 220. In some embodiments, the DRM device 210 may receive digital content which is at least partly decrypted. In such embodiments, obviously the decryptor may or may not process the already decrypted portion. The decryptor can at least partly decrypt—for example, fully decrypt part of a digital content file, and/or perform one or more decryption steps, which can be the complete decryption process or a subset of the complete decryption process, for a whole or part of the digital content. In some embodiments, the digital content can be received at least partly unencrypted.

A policy in the DRM device 210 participates in the process of verifying the eligibility of end use of the digital content or part of the digital content, allowing or disallowing operations such as decrypting, formatting, searching, and/or transmitting an output to the digital appliance. The verification may check one or several eligibility options, including the right to use the digital content, the right to use the digital content up to a certain date, the right to use the digital content between certain dates, the right to use the digital content after a certain date, the right to use the digital content for a certain accumulated usage time, the right to use the digital content for a certain number of times, the right to transfer the digital content, the right to modify the digital content, the right to add overlay information onto the digital content, the right to save the digital content into the DRM device 210 and/or another location, the right to save the overlay information into the device and/or another location, the right to copy the digital content, the right to copy portions of the digital content, the right to copy specific parts of the digital content, and other rights related to an end user in connection with an end use or distribution of the digital content. These might be checked by the policy to produce a result that might be one or more possible actions such as allowing the output to be transmitted to the digital appliance 220, disallowing the output from being transmitted to the digital appliance 220, erasing the digital content file or part of the digital content file, and/or allowing or disallowing operations such as search, edit, save, and other operations that a user may perform while in an end use of the digital content.

A formatter in the DRM device 210 participates in the process of rendering the digital content for an end use by the user. In some embodiments, where the optional co-processor chip 119 is available, the formatter may utilize the co-processor chip as parts of its formatting operation; this invention is not so limited.

In some embodiments the digital content is at least an encoded digital audio file such as MP3, MP3-pro, Ogg-vorbis, AAC, DTS, Dolby, ADPCM, WMA, or the like. The formatter decodes the digital content as part of the rendering process, for example transforms an encoded MP3 file to a decoded raw WAV file which may later be rendered to an audio signal to be presented for an end use to the user. In other embodiments, where the digital content is at least an encoded digital audio file, the formatter only partially decodes the file. In some embodiments, where the digital content is at least one encoded digital audio file, the formatter processes one or more of the files to produce an output that will be used for rendering audio, for example, the file may contain data that describes certain frequencies or amplitudes within the target audio In some embodiments the digital content is at least an encoded digital video file such MPEG1, MPEG2, MPEG4, WMV, DIVX, XVID, 3IVX, H.263, H.264, Quick time 6, Real, Windows Media or the like. The formatter decodes the digital content as part of the rendering process, for example transforms an encoded MPEG2 file to a decoded YUV file. In other embodiments, where the digital content is at least an encoded digital video file, the formatter only partially decodes the file. In some embodiments, where the content is at least an encoded digital video file, the formatter processes one or more of the files to produce an output that will be used for rendering video, for example, the file may contain data that describes certain frames or colors within the frames that affect the presentation of the target video.

In some embodiments, where the content is at least a software application or a game, the formatter may generate attributes such as images, run time code or outputs of algorithms that are utilized to create or visualize a software scenario or game scene.

In some embodiments the content is at least a digital book or a section of a digital book and the formatter at least generates a layout from the content for its presentation. In other embodiments of the formatter, the digital content is at least a digital book or a section of a digital book and the formatter at least generates an image from the content.

Digital appliance 220 receives and sends data from/to DRM device 210 through interface 221. Digital appliance 220 may process data. Digital appliance 220 may prepare digital content file for rendering. Digital appliance 220 may actually render digital content, for example by displaying a page of an ebook on a computer screen or sending audio signal to the audio processing electronics and eventually to the speakers.

FIG. 3 is a flowchart of an exemplary method for preparing a raw digital audio or video content file C for use with a DRM Device 110. The practice of preparation of raw digital content file such includes steps of compressing the digital content in order for the digital content file to occupy less storage space and consume less network resources while transmitted.

In preparing the digital content file for use with a DRM device, several assumptions are made. Firstly, if the entire digital content file C will at any point be fully present on a digital appliance, it will be cracked; thus, at least part of the digital content file must always be stored elsewhere, specifically on the DRM device. Secondly, for cost reduction purposes, the DRM device may have a much weaker computational capability than the hosting digital appliance. This means that the DRM device may not be able to execute all the computations necessary to prepare file C for presentation. Therefore when preparing the content file C for presentation, part of the data processing must be executed on the host digital appliance.

In step 301 content C exists in raw digital form as a file C, ready to be rendered. In some embodiments content C is a document, image, audio file, video file, software, game, parts of or combinations of the above, or any other type of digital content, this invention is not so limited.

In step 302 the file C is processed to produce files A and B such that there exist transformations f( ), g( ), h( ) for which $$C \approx F = f(g(A), h(B)) \qquad \text{Eq. (1)}$$

where f, a recombination algorithm executed on files g(A) and h(B), will produce F which is an identical copy or an almost identical copy (to human sight, sound and other perceptions) of the original file C. An almost identical copy file F is a file that can be rendered for usage with a minor degradation in quality or no degradation in quality in comparison to the original content file C when being used by an end user. File A and B are digital content files derived from the original file C, but each on its own lacks critical data necessary to be processed for use as a reasonably presentable digital content file. Using the transformations f( ), g( ) and h( ) files A and B can be reconstructed into file F.

In some embodiments, file A is intended for processing on the digital appliance and file B is intended for processing in the DRM device. In this case, at no time is file B available to the digital appliance.

According to some embodiments, transformation f( ) reproduces an exact copy of original file C, such that $$C = F = f(g(A), h(B)). \qquad \text{Eq. (2)}$$

The files A and B and the transformations f( ), g( ), h( ) may be adjusted to different types of content, this invention is not so limited.

An example of an original video file C is a file formatted in the YUV family of uncompressed video formats, and the like.

In some embodiments, for a digital content file C containing a copyrighted movie, an example of partitioning file C may be file A containing at least a processed form of the video information, and file B containing at least a processed form of the audio information, where file A is at least a compressed MPEG form that does not contain any audio and file B is at least the matching compressed audio.

In some embodiments, where video file C is formatted in the YUV family of uncompressed video formats, file A contains at least the Y and U channels and file B contains at least the V channel.

In some embodiments, where file C is a video file, file B contains at least some of the key-frames of an encoded form of file C, and file A contains at least the inter-frames which include the remaining information required to produce file F.

In some embodiments, relevant to both audio files C and the audio part of video files C is file A containing at least certain audio frequency ranges that can be used in the reproduction of F and file B containing the remaining frequency ranges.

In some embodiments, relevant to both audio files C and the audio part of video files C file A is stuffed with dummy data and file B holds all information necessary to remove the dummy data.

In some embodiments, where digital content file C is time oriented, file A may be a time shuffled version of file C, where each shuffled segment is several seconds long. In this case file B contains information necessary to un-shuffle file A. The length of each shuffled segment may be less than, equal to, or greater than several seconds, this invention is not so limited. The lengths of each of the shuffled segment may be different, this is invention is not so limited.

In some embodiments, where digital content file is time oriented, file A may be similar to file C, except that it has missing segments. The missing segments make up file B. It may be appreciated that the more missing segments in file A, the less usable file A is on its own.

In other embodiments, where digital content file C is time oriented, for example a WAV audio file coded in MP3 format, frames of equal duration are compressed into MP3 format. In the present invention, file C in WAV format is divided into frames slightly longer than the normal frame size. The part of the frame that is the same size as normal is coded into MP3 and stored in file A. The remainder is stored in WAV format in file B without compression. Neither file A nor file B can be used separately. Trying to listen to a song based solely on file A will result in a slight jump at the end of every frame.

In some embodiments, where file C is a software application or a game, file A contains code to be executed on the DRM device while file B contains code to be executed on the digital appliance. Codes in file A and file B need to execute simultaneously in order for the software application or game to function properly. The code in file A executing on DRM device is non-deterministic. The code in file A is a central part of the software application so it cannot be replaced by an alternate hacker code in file A' running on the digital appliance.

It may be appreciated by those skilled in the art that there exits various methods to process a file C into files A and B without departing from the spirit of this invention. The processing may be achieved by a single or a plurality of transformations that combined together can reproduce an identical copy or almost identical copy of the original file C; the invention is not so limited.

It may be appreciated by those skilled in the art that file C may be broken into more than 2 files A and B, for example a series of file A1 ... An, B1 ... Bm and transformations g1( ) ... g1( ) and h1( ) ... hk( ) without departing from the spirit of this invention.

In step 303 files A and B are optionally amended with more information and optionally further processed. In some embodiments, the files A, B and amendments are unified into a packaged file P.

In some embodiments, the additional information may be metadata regarding the digital content C such as title, creators, size, copyright notice, and any other type of information describing the digital content C. In some embodiments, the additional information may be content usage policies describing what end uses may be practiced on the content. In some embodiments, the additional information may be content usage policies describing what end uses may be practiced on the content with a specified DRM device. In some embodiments, the additional information may be content usage policies describing what end uses may be practiced on the content with a specified DRM device attached to a specified digital appliance. In some embodiments a watermark may be applied. In some embodiments, file P may be further processed, for example encrypted.

FIG. 4 is a flowchart of an exemplary method for rendering a digital content file using DRM Device 110.

In step 401 file P is distributed through a network to the DRM device that is attached to a host digital appliance.

In step 402 the DRM device extracts file A and file B from file P. This can follow a user request to use the content, or be executed immediately upon receiving file P, or executed due to any other trigger event or at any time; the invention is not so limited.

In step 403 the DRM device application checks the usage policy based on the specified request. A usage policy in the DRM device application participates in the process of verifying the eligibility of end use of the content file or a part of the content file, allowing or disallowing operations such as decrypting, formatting, and/or transmitting an output to the digital appliance. The verification may check one or several eligibility options, including the right to use the content file, the right to use the content file up to a certain date, the right to use the content file between certain dates, the right to use the content file after a certain date, the right to use the content file for a certain accumulated usage time, the right to use the content file for a certain number of times, the right to transfer the content file, and other rights related to an end user in connection with an end use of the content file. These might be checked by the policy to produce a result that might be one or more possible actions such as allowing the output to be transmitted to the digital appliance, disallowing the output from being transmitted to the digital appliance, erasing the content or part of the content, and/or other operations that a user may perform while in an end use of the content file. If user is allowed to access the content file, step 404 is initiated. If user is not allowed to access the content file, user is notified and sequence is terminated.

In step 404 the DRM device transmits file A to the host digital appliance for calculation of g(A).

In step 405 the DRM device processes file B to generate h(B) and the host digital appliance processes file A to generate g(A).

In step 406 g(A) is sent from the host digital appliance to the DRM device.

In step 407 the DRM device calculates F=f(g(A), h(B)).

In some embodiments, h(B) may transmitted from the DRM device to the host digital appliance for calculation of F=f(g(A), h(B)).

In step 408 file F is ready for end use.

It may be appreciated by those skilled in the art that at no point during the formatting process is the file B present on the digital appliance 220.

It may be appreciated by those skilled in the art, that the partitioning of file C into files A and B enables DRM device 210 to harness the computational power of digital appliance 220 in the formatting process. This results in a lower cost CPU 112 and perhaps other components of DRM device 210.

According to some embodiments, a process internal to the DRM device 210 adds additional data to the reassembled copyrighted digital content file F. In some embodiments, a digital watermark may be added. Adding a digital watermark at this stage enables employing the unique identity of the device into the watermark, thus later enabling the identification of the device from which copyrighted content was distributed.

In some embodiments, additional data is added to file simply to enlarge it. This is so distribution of file F will be more difficult or costly. An example is enlarging a file from 500 MB to 1000 MB. A 500 MB file may be burned onto a CD, whereas the enlarged file may not due to the limitations of capacity of a CD of around 700 MB. File F is enlarged by stuffing it with extra dummy data.

In some embodiments transformations f( ), g( ), and h( ) may degrade at least part of the digital content.

In some embodiments, where the content is a software application or a game, the transformation h( ) can depend on input from the digital appliance, for example a state of the game, and input from the user at a certain time or event. In some embodiments, the transformation h( ) includes algorithms that produce data to be utilized by the application based on the above inputs from the digital appliance.

The processing described with respect to FIGS. 3 and 4 is illustrated in a different format by respective FIGS. 5 and 6, wherein physical elements and process steps that correspond to those of FIGS. 1-4 are identified with the same reference numbers but with a prime (') added. Referring initially to FIG. 5, preparation of a digital content file C for transmission over the Internet or other network takes place. A first step 302' processes file C to produce two files A and B such that one of the equations (1) or (2) above is satisfied, depending upon the nature of file C and the processing being performed. This involves processing file C into files A and B such that when the functions g(A) and h(B) are taken and combined according to a function f(g(A), h(B)), the original content file C is reconstructed either exactly or, if the type of data and application permit, approximately. This processing is further performed such that the original content file C cannot be reconstructed in an acceptable manner by having one of g(A) or h(B) alone.

The files A and B are then combined, optionally with other information, into a file P, by a step 303'. As an example, data of the files A and B, plus any other information that is desired to be transmitted, are combined in time sequence. The files and additional information may be interleaved with each other to add some additional degree of security. The additional information may include a portion or all of the license data associated with the content file C.

File P may be compressed, by a step 501, and/or encrypted, by a step 503, before being stored in a content server 240'. Whether either data encryption 503 or compression 501 of the file P is desirable depends in part on the nature of the data and whether these functions have already been performed as part of the step 302' when producing the files A and B. The license data is preferably encrypted before being stored in a license server 250'. Data of a file obtained from the content server 240' and any license data obtained from the license server 250' that are associated with the processed file are combined in an interface 505. This combined signal is then transmitted over the Internet or some other data network.

The processing of the content file C may be done by the content server but is preferably performed by a separate computer in order to maintain a greater separation of the original content file C from the end user who likely has access to the content server 240'. The content server 240' will typically be accessed by the content consumer, remotely over the Internet or other network, for the processed file P data. Data of a large number of different files C, such as different books, songs and/or video pieces are usually stored concurrently on the servers 240' and 250'. The content and license servers 240' and 250' may be implemented by a single server.

If the processing 302' to obtain files A and B includes encrypting one or both of them, the further encryption 503 may be omitted as unnecessary. However, if only one of the files A or B is encrypted, it may be desirable to encrypt the file P. And even if both of the files A and B are in encrypted form, a second encryption 503 may be performed. The encryption process may utilize a key, identification of the encryption algorithm or even the algorithm itself obtained from the license data.

Similarly, the data compression 501 may be omitted, particularly if either or both of the files A and B have been compressed as part of the processing 302'. Alternatively, the steps 501 and/or 503 may be done after the data are stored on the content server 240', if the file P is to be compressed and/or encrypted.

Receiving the file P from the Internet or other network by a digital appliance 220' is shown in FIG. 6. The digital appliance provides an interface 601 to the network. The received data is then provided directly to the DRM device 210' and preferably stored in its re-programmable non-volatile memory 114', at least temporarily and, in some applications, permanently. The received file data are decrypted by a step 603, if the file P was encrypted by the step 503 (FIG. 5), typically using a key, identification of an algorithm or a decryption algorithm provided as part of the license data, Attributes of the file data being decrypted can also be separately supplied in this manner and used for security, such as its size, name, a digest of the file, checksum or other redundancy check parameter, or a fingerprint.

In another approach, the file data may be encrypted in either of the steps 302' or 303 (FIG. 5) by data unique to the individual DRM device 210' (FIG. 6). This can be a serial number or other identification of the DRM device 210'. That identification is then supplied during the decryption 603. Any attempt to decrypt the file data with other than the correct DRM device identification will then fail. Alternatively, an encryption key or key pair may be stored in the memory of each DRM device 210' and used for the encryption and decryption of the data stored in it. In these cases, the content data may only be decrypted and become useful with the single DRM device containing the unique key or identification. The key or identification is preferably stored in the DRM device as part of the process of manufacturing it. Neither is therefore transmitted over a network or otherwise accessible outside of the DRM device.

Similarly, the data are decompressed by a step 605 if necessary because the data of File P were compressed by the step 501 before being sent over the network. This results in file P, or something close to file P if any compression and decompression process is lossy.

A next step 402' extracts files A and B and any additional information from file P. If the files A and B and any additional information were sent one after the other, they are separately received in time sequence. If interleaved, the received data stream is separated into the files A and B and any additional information by knowing the interleaving pattern used when the data were sent. The calculation of the function h(B) from the file B is performed at step 607 within the DRM device 210'. File A is transferred, on the other hand, to the digital appliance 220', where g(A) is calculated at step 609 and sent back to the DRM device 210'. The function f(g(A), h(B)) is then calculated from g(A) and h(B), by a step 407'.

Data of the file F, which are exactly or approximately the original data of the content file C, are then rendered by a step 611 into a form for use by a particular type of digital appliance 220', such as a personal computer. This step may include limiting the form of the file data that are passed to a utilization portion 613 of the digital appliance 220', possibly according to the license data, in a manner that render the data in a form useful for the intended purpose but not particularly useful for unlicensed copying and/or distribution.

For a relatively small static content file C, such as the text of a book or other document, the entire results of calculating g(A) in the digital appliance 220' and h(B) by the DRM device 210' may be stored entirely within its memory 114' and the processing of FIG. 6 performed on the entire file. But it is more common to perform the process of FIG. 6 in a repetitive, iterative manner on only a portion of the data files at one time. For example, if the content is music or video data, then the reconstruction of a portion of the files A and B in the DRM device 210' is performed frequently, such as 50 times per second. Short correlated pieces of files A and B are processed at one time in the manner illustrated by FIG. 6, followed by the next in time sequence of correlated pieces of the files A and B processed in the same manner, and so forth. Such repetitive, iterative processing is utilized particularly when the processed file received by the DRM device 210' is too large for the available storage capacity of the memory 114', or when it is desired to perform the calculations and render the result in real time as the data are received by the DRM device.

In addition to the protection that data encryption provides, license data provided by the content provider and stored in the memory 114' may further control operation of the DRM device 210'. The license data can limit use of a particular data file to a specific number of times, a range of dates, and the like. It can also control the formatting 611 to render the data in a particular limited way specific to the DRM device or user. These are checked and controlled by an eligibility verification step 614. When attempting to operate outside of such license rights, processing and rendering the data within the DRM device 210' can be terminated entirely, as illustrated by interrupting one or more essential data transmission paths at 615, 617 and/or 619. If license data are included in the additional information, they may instead be used to control these data transmission paths and also applied to any or all of the blocks 607, 609, 611 and 614. A primary aspect of the processing described above takes place by preparing data of the file C for transmission at a step 302' of FIG. 5, and then by reversing the effect of the step 302' in the DRM device and digital appliance by the steps 607, 609 and 407' of FIG. 6. This part of the processing of FIGS. 3-6 is illustrated in a different format in FIG. 7. In an example implementation, the content file C is separated by processing 651 into components $C_1$ and $C_2$. These components are then individually processed by respective processing 653 and 655. The result of the processing 653 is file A, and the result of the processing 655 is the file B. The processing 653 and 655 can be encryption, compression or some other form of processing. The type of processing 653 and 655 need not be the same. Also, both of the processing steps 653 and 655 need not always be performed.

Files A and B are then usually transmitted over a network such as the Internet, in the form of the previously described file P or otherwise. When received, the data of file A are subjected to processing 657 that is the inverse of the processing 653. That is, if the processing 653 compresses data to form file A, the processing 657 decompresses the data of File A. Similarly, the received data of file B are subjected to processing 659 that is the inverse of the processing 655. The products g(A) and h(B) of this processing are then combined at 661 by a process that is the inverse of the separation process 651. The result of the combination is file F, which is either exactly or approximately the same as the original file C, depending on whether any of the intermediate processing has created any data loss or distortion.

In one of the embodiments described above, where the file C contains data of a movie, the file is divided into a video component $C_1$ and an audio component $C_2$. File A results from the processing 653 of the video component $C_1$, such as by compression, and file B from the processing 655 of the audio component $C_2$, which may also be compression. The processing step 657 then decompresses File A with an inverse of the compression algorithm used in the step 653. Similarly, File B is decompressed by the processing 659 with an inverse of the algorithm used for the processing 655.

In another of the embodiments described above, the frequency range of an audio file C is divided into two distinct component ranges $C_1$ and $C_2$ by the step 651. File A results from the processing 653 of the $C_1$ component data, and File B from the processing 655 of the $C_2$ component data.

In another embodiment described above, the separation processing 651 divides color components of a video signal file C into two parts, file A being formed of one or more but less than all the components, and file B including the remaining component(s). Combining the processed files A and B in the step 651 puts all the color components back into data F of a single video signal.

In others of the embodiments described above, the processing 651 includes generating the component $C_1$ by making some modification to the file C, while the component $C_2$ holds information necessary to reverse that modification. The processing 661 then combines data in a manner to reverse the modification. Such modifications include adding dummy data, time shuffling the data or removing data segments.

The DRM device 210' is most conveniently implemented in one or more of the flash memory cards or flash drives that are commercially available. Suitable memory cards are those sold under the trademarks CompactFlash (CF), Multi-Media Card (MMC), Secure Digital (SD), miniSD, TransFlash, Memory Stick and others. Flash drives sold under the Cruzer trademark can also be used. SanDisk Corporation, the assignee hereof, manufactures and sells these memory cards and flash drives. They are suitable because they have enough processing power to both manage the flash memory and perform the processing indicated in FIG. 6 for most applications.

By offloading the calculation of g(A) from the DRM device 210' to the digital appliance 220', even cards or drives with a lesser amount of processing power may still be used, usually at a lower cost. The more processing intensive calculations are then caused to be performed by the digital appliance 220', which will often have much more processing capability than the flash device. For security, the digital appliance has access to only part of the original file C, namely g(A) in this example, which is not useful by itself. Indeed, the division of the original content file C (FIG. 5) into files A and B may be performed so that a vast majority of the data are kept within the file A and only enough data to render the file A useless by itself are placed in the file B. This allows the usually superior processing power and memory capacity of the digital appliance 220' to be utilized to calculate g(A) while a relatively small amount of processing power and memory capacity of the DRM device 210' are necessary to calculate h(B) and render the file F (FIG. 6). This can be especially useful when the content is high data rate streaming audio or video content since both devices need to keep in synchronism by processing corresponding pieces of g(A) and h(B) within the same increment of time. A ratio of processing power between the two may be two, four, ten or more, and a ratio of the memory storage capacity of the two may be similar. The relatively modest DRM device thereby controls reconstruction of the content file C with security and digital rights management. The same principle can also be applied in the reverse case, when the digital appliance has the lesser processing power and/or memory capacity than the DRM device.

The structure of such a flash memory device 701 is generally illustrated in FIG. 8. It contains flash memory 114' having an array or arrays of flash memory cells formed on one or more semiconductor integrated circuit chips. A memory controller 703, usually formed on another chip, typically includes a bus 705 extending between an interface 707 with the flash memory 114' and an interface 709 of the device. Connected to the bus 705 are a micro-processor 711, a memory 113', including volatile random-access-memory (RAM), and typically one or more circuits for making special purpose calculations, such as a circuit 713 for calculating error correction codes (ECCs) from the data and a security processing circuit 715. An external connector 717 is formed on an outside of the memory device, with a mechanically and electrically mating connector 719 on the digital appliance 220'.

The microprocessor 711 of the memory device 701 of FIG. 8 makes the calculations described for the DRM device 210' of FIG. 6. Firmware that is executed by the microprocessor 711 to make these calculations is typically stored in the flash memory 113' and loaded into the controller memory 113' as necessary. The flash memory 114' may be partitioned into at least two parts, one part being addressable by the user for writing and reading user data, as well as encrypted file P content. A logical address space specified for the memory device is mapped into this user accessible first part. The second part of the memory 114' is made inaccessible to the user, and is typically used to store content that is not to be accessed directly by the user, data of encryption keys, a serial number or other unique identification of the device and the operating firmware. When data received by the DRM device 210' and intermediate products of the calculations illustrated in FIG. 6 are stored in the second part of the memory 114'. Data of one of the files A or B, or both, extracted by the step 402', or sequential small portions of them, are examples of intermediate calculation results that are so stored. File F may also be stored in this manner until outputted to the digital appliance 220'. The controller 703 has access to this second part in order to perform its functions but it is not within the logical address space of the memory device that is seen by the digital appliance 220'.

The form of the connector 717 (FIG. 8) is specific to the standard for the particular memory card or flash drive employed. Many such standards exist. For example, a public document describing the physical and some electrical characteristics of the SD Card is available from the SD Association (SDA): "Simplified Version of: Part 1 Physical Layer Specification Version 1.01," dated Apr. 15, 2001. Specifications of the TransFlash memory card are available from SanDisk Corporation. Mechanical and electrical details of the USB interface are provided by the "Universal Serial Bus Specification," revision 2.0, dated Apr. 27, 2000. Another, higher transfer rate interface, known as FireWire, is specified by the following standard of the Institute of Electrical and Electronics Engineers (IEEE): "IEEE Standard for a High Performance Serial Bus," document no. IEEE 1394-1995, as amended by document nos. IEEE 1394a-2000 and IEEE 1394b-2002. The foregoing specifications and standards are incorporated herein by these references.

A common form of the DRM device 210' and digital appliance 220' is shown in FIG. 9. The DRM device 210' is a flash drive having a USB plug 717' for removable insertion into an USB receptacle 719' on the digital appliance 220', which will commonly be a personal computer, notebook computer or other host that contains an USB receptacle. Of course, other digital appliances may provide similar connectivity for other forms of the memory device. Alternatively, the plug 717' may be in the form of a FireWire connector. Further, wireless communication may be used between the digital appliance 220' and DRM device 210' instead of a wired connection between them.

The use of an SD card 210" as the DRM device is also illustrated in FIG. 9, being removably inserted into a card slot 719" of the digital appliance 220' to electrically connect with its external contacts 717". Some form of memory card adaptor, such as one that also plugs into a USB receptacle of a digital appliance, may be employed instead of utilizing a dedicated card slot on the digital appliance itself.

Another memory storage device very useful for the DRM device is a memory card having two different external connectors on the card that both connect to the internal memory controller, one for insertion into a USB receptacle and another with a standard set of card contacts, such as according to the SD card standards. Such a device is described in two U.S. patent applications filed Apr. 16, 2004, Ser. No. 10/826,801, entitled "Memory Cards Having Two Standard Sets of Contacts," and Ser. No. 10/826,796, entitled "Memory Card with Two Standard Sets of Contacts and a Contact Covering Mechanism." Both of these applications are incorporated herein by these references.

It is also desirable to manufacture the DRM device in a manner that makes it difficult to be disassembled. This provides additional security of the data stored in it. One such manufacturing technique and a flash drive resulting from it are described in United States patent application publication no. 2004/0137664A1, which application is incorporated herein in its entirety by this reference.

Any visual content of the file C may be viewed by the user on the digital appliance's visual display 721, and any audio content heard through audio speakers 723 or earphones. The digital appliance 220' may include only one of the display 721 or the audio source 723, or multiple copies of one of them, if dedicated to reproduce only visual or audio content, respectively. Some other human sensory transducer may be used when appropriate for reproducing data of the content file C.

The description above contemplates that the DRM device is implemented in the form of a memory card or flash device that is removable from the digital appliance. However, there are applications where it is desirable to permanently install the DRM device within a digital appliance, an example being where the digital appliance is highly portable such as an audio MP3 player. In such a case, the DRM device is preferably separately formed in a sealed package to increase the difficulty of it being disassembled, thereby increasing the security of the data being processed.

Although the present invention has been described with reference to particular embodiments, it is not to be construed as being limited thereto. Various alterations and modifications can be made to the embodiments without in any way departing from the scope or spirit of the present invention.

It is claimed:

1. A method of processing digital data by a digital rights management (DRM) device in combination with and removably connected to a digital appliance, the data in a form of at least first and second separate units, the method comprising:
  in the DRM device:
    receiving a request from the digital appliance to use the data,
    in response to receiving the request, determining whether to authorize use of the data by the digital appliance, in response to authorizing use of the data by the digital appliance:
  accessing the first unit of data and the second unit of data, wherein the first unit of data and the second unit of data are based on the following:

$C \approx F = f(g(A), h(B))$ or $C = F = f(g(A), h(B))$ in which B represents the first unit of data, A represents the second unit of data, and C represents the data, wherein f( ) is a function to provide a copy of a file and g( ) and h( ) are transformation functions;
  sending the second unit of data to the digital appliance for processing,
  processing the first unit of data by generating h(B),
  in response to sending the second unit of data to the digital appliance for processing, receiving processed second unit of data represented as g(A) from the digital appliance, the second unit of data having been processed in the digital appliance by generating the g(A),
  in response to receiving the processed second unit of data represented as the g(A) from the digital appliance, combining the processed first and second units of data in the DRM device by generating f(g(A), h(B)), and
  sending the combined processed first and second units of data represented as f(g(A), h(B)) to the digital appliance for use in the digital appliance.

2. The method of claim 1, wherein the data include multimedia data having both video and audio components, and
  wherein the second unit of data includes compressed data of the video component without data of the audio component and the first unit of data includes compressed data of the audio component.

3. The method of claim 1, wherein the data comprises a video signal having a plurality of color components, and
  wherein the first unit of data includes data of less than all the plurality of color components and the second unit of data includes data of at least another of the plurality of color components.

4. The method of claim 1, wherein the data include encoded data frames, and
  wherein the first unit of data includes at least key frames thereof and the second unit of data includes remaining inter-frames thereof.

5. The method of claim 1, wherein the data includes data of an audio signal, and
  wherein the first unit of data includes data of at least certain audio frequency ranges and the second unit of data includes data of remaining audio frequency ranges.

6. The method of claim 1, wherein the data includes data of an audio signal, and
  wherein the second unit of data includes the audio data plus dummy data and the first unit of data includes data of information necessary to remove the dummy data from the first unit.

7. The method of claim 1, wherein the data comprises a time oriented signal, and
  wherein the second unit of data includes a time shuffled version of the data and the first unit of data includes data of information necessary to un-shuffle data of the first unit.

8. The method of claim 1, wherein the data comprises a time oriented signal, and
  wherein the second unit of data includes the data with segments thereof missing and the first unit of data includes data of the missing segments.

9. The method of claim 1, wherein the data comprises encoded WAV audio file and divided into frames of data longer than a given length, and
  wherein the first unit of data includes data of the given length of the frames and the second unit of data includes remaining data of the frames.

10. The method of claim 1, wherein sending the combined processed first and second units of data to the digital appliance is performed wirelessly.

11. A method according to claim 1, further comprising receiving, by the DRM device, the first unit of data separate from the second unit of data.

12. A method according to claim 11, wherein the DRM device receives the first unit of data after the first unit of data has been transmitted over a communication network in a manner that maintains separate identity of the first unit of data from the second unit of data.

13. The method of claim 1, wherein use in the digital appliance comprises play of the data in the digital appliance.

14. The method of claim 1, wherein the digital appliance comprises a host digital appliance configured to host the DRM device; and
  wherein an amount of processing of the first unit of data by generating h(B) is less than an amount of processing of the second unit of data by generating the g(A).

15. The method of claim 1, wherein processing the first unit of data comprises at least one of decryption, decoding, or decompression of the first unit of data; and
  wherein receiving processed second unit of data comprises receiving decrypted, decoded or decompressed second unit of data.

16. The method of claim 1, wherein the first unit of data and the second unit of data comprise divisions of the data based on at least one criteria such as time, frequency, size, key frames or dummy data.

17. A method of processing data received by a digital appliance when the digital appliance is in communication with a digital rights management (DRM) device, wherein the data comprises a first of data and a second unit of data, the DRM device removably connected to the digital appliance, the method comprising:
  in the digital appliance:
    sending a request to the DRM device to use the data, wherein the first unit of data and the second unit of data are based on the following;

$C \approx F = f(g(A), h(B))$ or $C = F = f(g(A), h(B))$ in which B represents the first unit of data, A represents the second unit of data, and C represents the data, wherein f( ) is a function to provide a copy of a file, and g( ) and h( ) are transformation functions;
    in response to sending the request, receiving the second unit of data represented as A at the digital appliance for processing;
    in response to receiving the second unit of data, processing the second unit of data in the digital appliance by performing a transformation on the second unit of data using g(A);
    sending the processed second unit of data represented as g(A) to the DRM device in order for the DRM device to combine the processed first and second units of data by generating f(g(A), h(B));

in response to sending the processed second unit of data to the DRM device, receiving from the DRM device the processed first and second units of data as combined data represented as f(g(A),h(B)); and utilizing the combined data in the digital appliance.

18. The method of claim 17, further comprising receiving the data file in a form of at least first and second separate units of data and sending the data file in the form of the at least first and second units of data to the DRM device, wherein the request to use the data is sent to the DRM device after sending the data file to the DRM device.

19. A digital rights management (DRM) device configured to process data in combination with a digital appliance, the data in a form of at least first and second separate units of data, the DRM device comprising:

a memory, an interface configured to removably connect the DRM device to the digital appliance and to communicate data into and out of the DRM device, and a controller in communication with the interface and the memory, the controller configured to:

receive a request from the digital appliance to use the data, in response to receiving the request, determine whether to authorize use of the data by the digital appliance, in response to authorizing use of the data by the digital appliance:

access the first unit of data and the second unit of data, wherein the first unit of data and the second unit of data are based on the following:

$C \approx F = f(g(A), h(B))$ or $C = F = f(g(A), h(B))$ in which B represents the first unit of data, A represents the second unit of data, and C represents the data, wherein f( ) is a function to provide a copy of a file, and g( ) and h( ) are transformation functions;

send the second unit of data to the digital appliance for processing, process the first unit of the data to form a processed first unit by generating h(B), in response to sending the second unit of data to the digital appliance for processing, receive, via the interface, processed second unit of the data represented as g(A) from the digital appliance, the second unit of data having been processed in the digital appliance by generating the g(A), in response to receiving the processed second unit of data represented as the g(A) from the digital appliance, combine the first and second units of the data by generating f(g(A), h(B)), and send, via the interface, the combined processed first and second units of the data represented as f(g(A), h(B)) back though the interface to the digital appliance for use in the digital appliance.

20. The DRM device of claim 19, wherein the processor comprises a microprocessor;

wherein the memory comprises a semiconductor memory; and wherein at least the microprocessor and the semiconductor are encapsulated.

21. The DRM device of claim 19, wherein the interface includes a mechanical connector having electrical contacts accessible from outside of the DRM device in order for removable connection with the digital appliance.

22. The DRM device of claim 21, wherein the connector includes an USB connector.

23. The DRM device of claim 21, wherein the connector includes electrical contacts according to an SD memory card standard.

24. The DRM device of claim 21, wherein the connector includes electrical contacts according to a TransFlash memory card standard.

25. The DRM device of claim 21, wherein the connector includes electrical contacts according to a Memory Stick memory card standard.

26. The DRM device of claim 19, wherein the interface includes two mechanical connectors accessible from outside of the module.

27. The DRM device of claim 26, wherein the two mechanical connectors include an USB connector and a set of electrical contacts according to an existing memory card standard.

28. The DRM device of claim 19, wherein the data comprises a data file;

wherein the controller is further configured to extract from the data file the first and second units of data, the first and second units of data comprising simultaneously occurring data components of the data file.

29. The DRM device of claim 19, wherein the digital appliance comprises a host digital appliance configured to host the DRM device; and wherein the interface is configured to mechanically and electrically mate with a connector on the host digital appliance.

30. The DRM device of claim 29, wherein an amount of processing of the first unit of data by generating h(B) is less than an amount of processing of the second unit of data by generating the g(A).

31. The DRM device of claim 19, wherein the controller is configured to process the first unit of data by at least one of decrypting, decoding, or decompressing the first unit of data; and wherein the controller is configured to receive the processed second unit of data by receiving decrypted, decoded or decompressed second unit of data.

32. A digital rights management (DRM) device for processing data in combination with a digital appliance, the data in a form of at least first and second separate units of data, the DRM device comprising:

a memory, an interface configured to removably connect the DRM device to the digital appliance and to communicate data into and out of the DRM device, a hardware processor configured for:

receiving a request from the digital appliance to use the data, determining whether to authorize use of the data by the digital appliance in response to receiving the request, in response to authorizing use of the data by the digital appliance:

accessing the first unit of data and the second unit of data, wherein the first unit of data and the second unit of data are based on the following:

$C \approx F = f(g(A), h(B))$ or $C = F = f(g(A), h(B))$ in which B represents the first unit of data, A represents the second unit of data, and C represents the data, wherein f( ) is a function to provide a copy of a file, and g( ) and h( ) are transformation functions;

sending the second unit of data to the digital appliance for processing, processing the first unit of the data to form a processed first unit by generating h(B), in response to sending the second unit of data to the digital appliance for processing, receiving, via the interface, processed second unit of the data represented as g(A) from the digital appliance, the second unit of data having been processed in the digital appliance by generating the g(A), in response to receiving the processed second unit of data represented as the g(A) from the digital appliance, combining the first and second units of the data by generating f(g(A), h(B)), and sending, via the interface, the combined processed first and second units of the data represented as f(g(A), h(B)) back though the interface to the digital appliance for use in the digital appliance.

\* \* \* \* \*